United States Patent
Bhownani et al.

(10) Patent No.: US 10,831,456 B1
(45) Date of Patent: Nov. 10, 2020

(54) EXTERNAL CODE INTEGRATIONS WITHIN A COMPUTING ENVIRONMENT

(71) Applicant: The MathWorks, Inc., Natick, MA (US)

(72) Inventors: Vivek Bhownani, Ashland, MA (US); Alexander C. Feinman, Waltham, MA (US); Fazil Peermohammed, Holliston, MA (US); David A. Foti, Holliston, MA (US); Ebrahim Mehran Mestchian, Newton, MA (US); Yao Ren, Sudbury, MA (US); Vijaya Raghavan, Brookline, MA (US); Peter S. Szpak, Newton, MA (US); Matthew Englehart, Valley City, OH (US); Roy Mathew, Mansfield, MA (US); Emmanuel Roy, Les Loges en Josas (FR); Dekun Pei, Marlborough, MA (US); Jianhao Du, Framingham, MA (US); Antoine Requet, Sevres (FR); Shailesh Shashikant Nirgudkar, Acton, MA (US)

(73) Assignee: The MathWorks, Inc., Natick, MA (US)

(*) Notice: Subject to any disclaimer, the term of this patent is extended or adjusted under 35 U.S.C. 154(b) by 0 days.

(21) Appl. No.: 16/428,445

(22) Filed: May 31, 2019

(51) Int. Cl.
    *G06F 9/44* (2018.01)
    *G06F 8/41* (2018.01)
    (Continued)

(52) U.S. Cl.
    CPC ............. *G06F 8/427* (2013.01); *G06F 8/34* (2013.01); *G06F 8/38* (2013.01); *G06F 8/4443* (2013.01); *G06F 8/315* (2013.01)

(58) Field of Classification Search
    CPC ... G06F 8/34; G06F 8/38; G06F 8/443; G06F 8/427; G06F 8/315
    (Continued)

(56) References Cited

U.S. PATENT DOCUMENTS

| | | | | |
|---|---|---|---|---|
| 4,931,928 A | * | 6/1990 | Greenfeld | G06F 8/427 707/999.003 |
| 5,313,387 A | * | 5/1994 | McKeeman | G06F 8/425 700/90 |

(Continued)

OTHER PUBLICATIONS

Storey, Comparing Relationships in Conceptual Modeling: Mapping to Semantic Classifications, IEEE, pp. 1478-1489 (Year: 2005).*

(Continued)

*Primary Examiner* — Anil Khatri
(74) *Attorney, Agent, or Firm* — Young Basile Hanlon & MacFarlane, P.C.

(57) ABSTRACT

Processing external code includes: parsing the external code to identify a first semantic entity, mapping the first semantic entity to a second semantic entity, the first semantic entity comprising a first set of one or more specified attributes and the second semantic entity comprising a second set of one or more attributes that are capable of being specified, determining that a first attribute of the second set of one or more attributes does not have a corresponding specified attribute within the first set of one or more specified attributes, determining available information for specifying the first attribute of the second set of one or more attributes, and storing the second semantic entity in association with the first attribute of the second set of one or more attributes specified based on user selection or specifying the first attribute in response to available information provided to a user interface system.

28 Claims, 30 Drawing Sheets

(51) Int. Cl.
*G06F 8/34* (2018.01)
*G06F 8/38* (2018.01)
*G06F 8/30* (2018.01)

(58) Field of Classification Search
USPC .................................. 717/106–115, 136–138
See application file for complete search history.

(56) References Cited

U.S. PATENT DOCUMENTS

| | | | | |
|---|---|---|---|---|
| 5,680,627 | A * | 10/1997 | Anglea | G06N 3/04 704/1 |
| 5,701,490 | A * | 12/1997 | Safonov | G06F 8/427 717/143 |
| 5,835,749 | A | 11/1998 | Cobb | |
| 6,091,897 | A | 7/2000 | Yates et al. | |
| 7,089,541 | B2 * | 8/2006 | Ungar | G06F 8/427 717/112 |
| 7,178,112 | B1 * | 2/2007 | Ciolfi | G06F 30/3323 703/2 |
| 7,316,011 | B1 * | 1/2008 | Rajaram | G06F 8/427 717/144 |
| 7,546,234 | B1 * | 6/2009 | Deb | H04L 63/0236 704/9 |
| 7,761,478 | B2 * | 7/2010 | Akkiraju | G06Q 10/06 707/794 |
| 7,761,858 | B2 * | 7/2010 | Chang | G06F 8/20 717/140 |
| 7,924,590 | B1 * | 4/2011 | Starovoitov | G06F 8/427 365/49.17 |
| 8,561,015 | B2 * | 10/2013 | Rowan | G06F 8/20 717/105 |
| 8,566,789 | B2 * | 10/2013 | Siddaramappa | G06F 16/80 717/110 |
| 8,566,790 | B2 | 10/2013 | Schneider et al. | |
| 8,713,528 | B1 * | 4/2014 | Conrad | G06F 11/3604 717/124 |
| 8,762,969 | B2 * | 6/2014 | Meijer | G06F 8/427 717/143 |
| 9,047,097 | B2 | 6/2015 | Cabillic et al. | |
| 9,430,520 | B2 * | 8/2016 | Dove | G06F 16/24 |
| 10,432,449 | B2 * | 10/2019 | Dong | H04L 41/024 |
| 10,699,196 | B2 * | 6/2020 | Lindsley | G06F 16/9024 |
| 10,740,075 | B2 * | 8/2020 | Gass | G06F 8/425 |
| 2010/0293166 | A1 * | 11/2010 | Hatami-Hanza | G06F 16/278 707/739 |
| 2017/0177740 | A1 | 6/2017 | Abaya et al. | |

OTHER PUBLICATIONS

Doan et al, "Learning to match ontologies on the SemanticWeb", The VLDB Journal, pp. 303-319 (Year: 2003).*

Benatallah et al, "A Framework for Rapid Integration of Presentation Components", ACM, pp. 923-932 (Year: 2007).*

Gomez et al, "Visually Supporting Source Code Changes Integration: the Torch Dashboard", IEEE, pp. 55-64 (Year: 2010).*

Antoniol et al, "Towards the Integration of Versioning Systems, Bug Reports and Source Code Meta-Models", Electronic Notes in Theoretical Computer Science, pp. 87-99 (Year: 2005).*

Villanti et al, "Differential Post Detection Integration Techniques for Robust Code Acquisition", IEEE, pp. 2172-2184 (Year: 2007).*

Zhang et al, "Extracting Reusable Object-Oriented Legacy Code Segments with Combined Formal Concept Analysis and Slicing Techniques for Service Integration", IEEE, pp. 1-8 (Year: 2006).*

Knauss et al, "Supporting Continuous Integration by Code-Churn Based Test Selection", IEEE, pp. 19-25 (Year: 2015).*

* cited by examiner

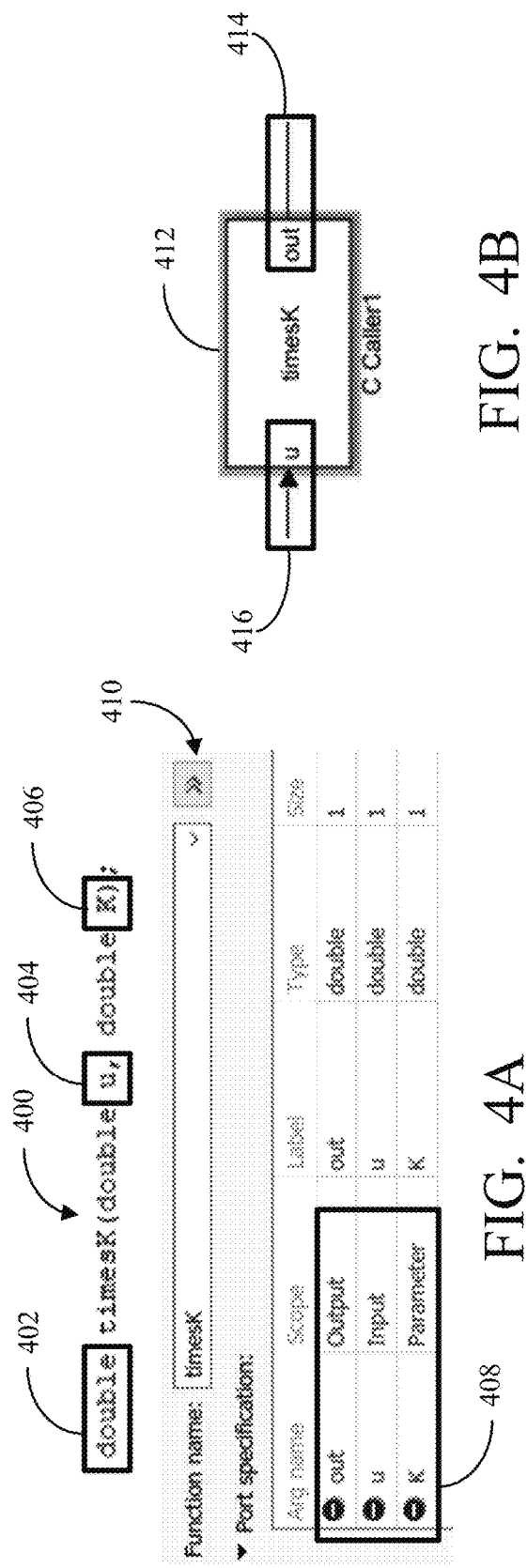
FIG. 4A
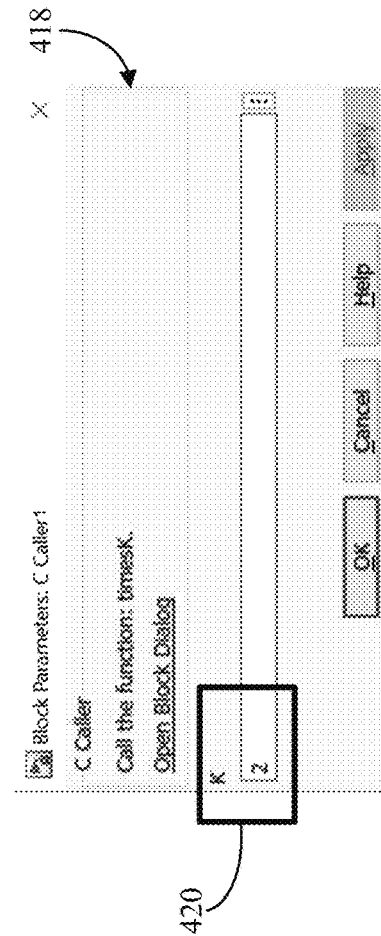
FIG. 4B
FIG. 4C

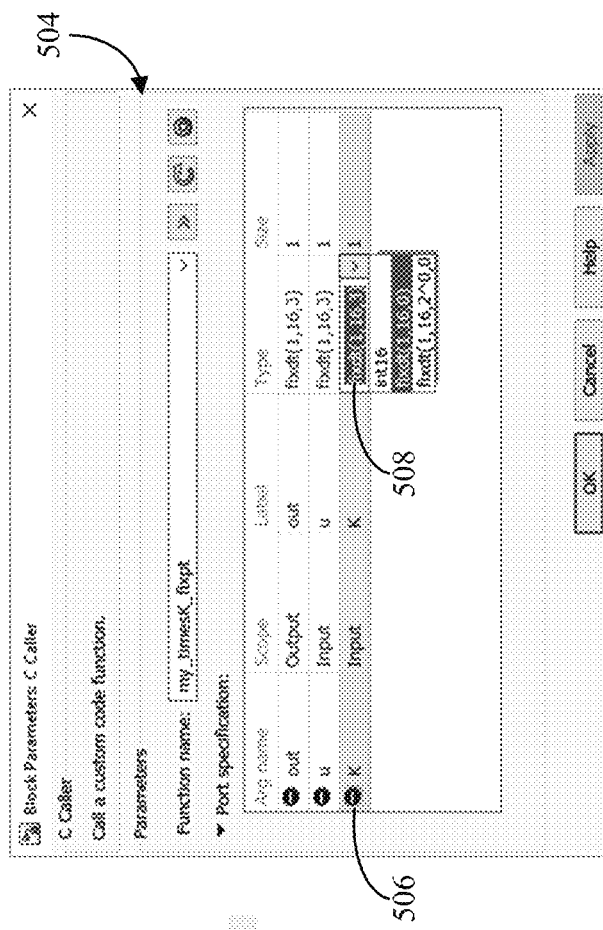
FIG. 5A
FIG. 5B
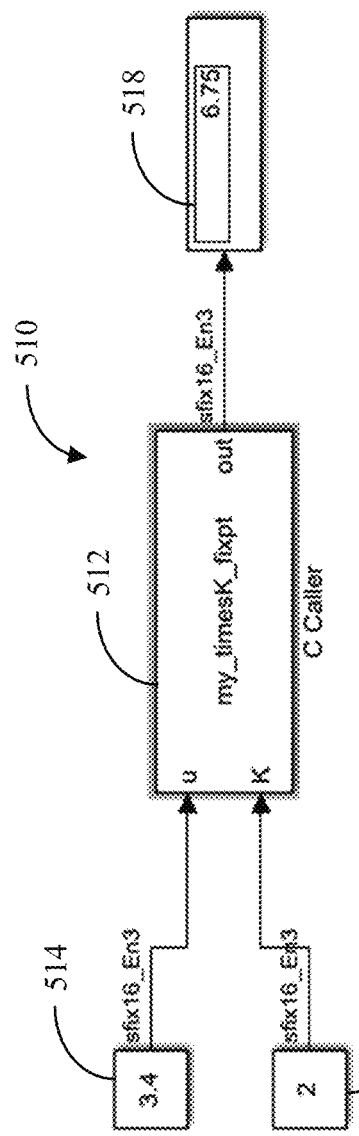
FIG. 5C

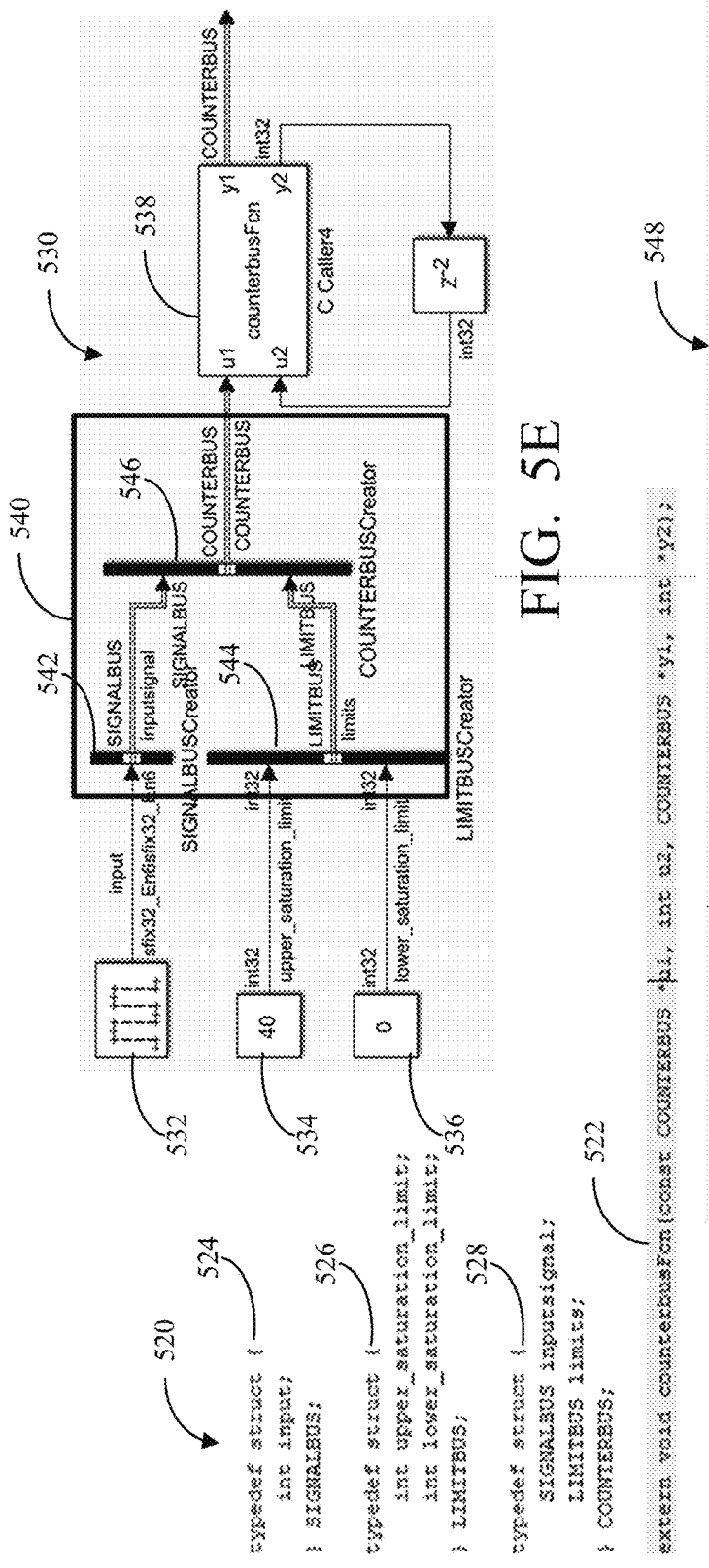
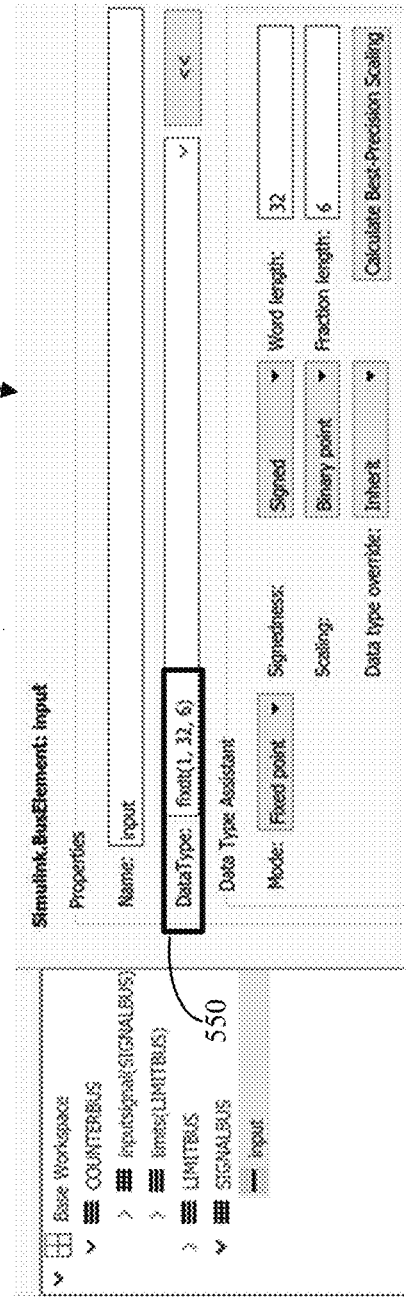
FIG. 5D
FIG. 5E
FIG. 5F

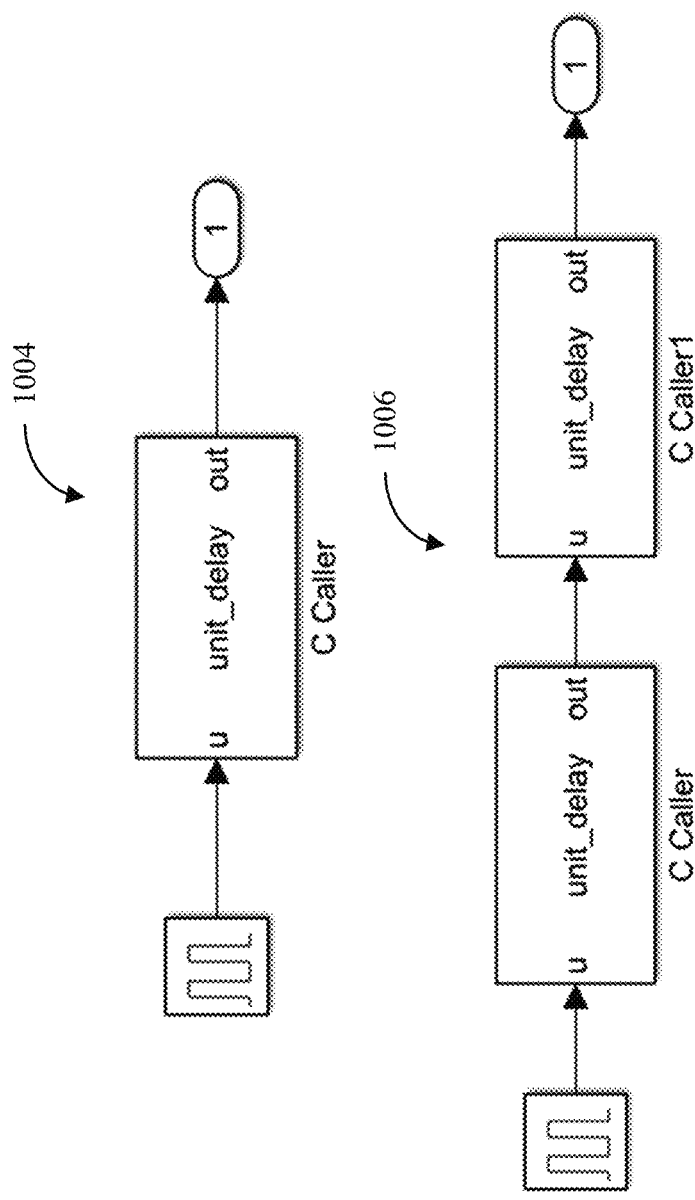

| External Code Elements (C/C++) | Element Examples First Native Environment | Element Examples Second Native Environment |
|---|---|---|
| C++ Namespace | Package | Scope Name for Scoped Function or Service |
| Pass/Return Array/Pointer/Reference | Array with Appropriate Direction/Shape | Signal/Parameter/Block State with Appropriate Direction/Shape |
| Default Arguments | Vararg | Default Argument |
| Ordinary Functions | Function | Server Catalog Function |
| C++ Class | Class | Service Port or Custom Type |
| Singleton Class | Singleton Class | Single Instantiated Service Port |
| Public Data Members | Property | Service Port Block Parameter or Custom Type Field |
| Public Member Functions | Method | Service Function Provided by Service Port or Action of Custom Typed Signal |
| Nested Class Definition | Package Level Class | Nested Class Definition |
| std::string | String | String |
| Inheritance | Inheritance | Inheritance |
| C++ Exception | Exception | Runtime Error |
| Template Instantiations | Class | Template Instantiations |
| Unresolved Forward Declarations | Abstract Class | Unresolved Forward Declaration |
| Structures | Class/Struct | Bus Type Data and Signals |
| Enumeration | Enumeration | IntEnumType Data and Signals |
| Void * | Equivalent Type | Custom Type |

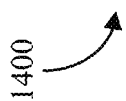

FIG. 14

MLX Definition:

```
fooDefinition = addFunction(libDef, ...
    "void foo(int & input1)", ...
    "MATLABName", "clib.ref.foo", ...
    "Description", "clib.ref.foo    Representation of C++ function foo"); % This description is shown as help to user. Modify it to appropriate description.
defineArgument(fooDefinition, "input1", "int32", "inputoutput");
validate(fooDefinition);
```

FIG. 16

```
%fooDefinition = addFunction(libDef, ...
%    "void foo(int * input,int length)", ...
%    "MATLABName", "clib.ptr.foo", ...
%    "Description", "clib.ptr.foo    Representation of C++ function foo"); % This
description is shown as help to user. Modify it to appropriate description.
%defineArgument(fooDefinition, "input", "int32", <DIRECTION>, <SHAPE>)
%defineArgument(fooDefinition, "length", "int32");
%validate(fooDefinition);
```

FIG. 17

```
fooDefinition = addFunction(libDef, ...
    "void foo(int * input,int len)", ...
    "MATLABName", "clib.ptr.foo", ...
    "Description", "clib.ptr.foo Representation of C++ function foo"); % This description is shown as help to user. Modify it to appropriate description.
defineArgument(fooDefinition, "input", "int32", "inputoutput", "len");
defineArgument(fooDefinition, "length", "int32");
validate(fooDefinition);
```

FIG. 18

```
fooDefinition = addFunction(libDef, ...
    "void foo(int * input,int len)", ...
    "MATLABName", "clib.ptr.foo", ...
    "Description", "clib.ptr.foo     Representation of C++ function foo"); % This
description is shown as help to user. Modify it to appropriate description.
defineArgument(fooDefinition, "input", "int32", "output", "len")
defineArgument(fooDefinition, "length", "int32");
validate(fooDefinition);
```

FIG. 19

```
C++ class method writeFormula for C++ class libxl::ISheetT<char>

C++ Signature: bool libxl::ISheetT<char>::writeFormula(int row,int col,char const * expr,libxl::IFormatT<char> * format)

writeFormulaDefinition = addMethod(SheetDefinition, ...
% "bool libxl::ISheetT<char>::writeFormula(int row,int col,char const * expr,libxl::IFormatT<char> * format)", ...
% "Description", "clib.libxl.libxl.Sheet.writeFormula    Method of C++ class
libxl::ISheetT<char>::writeFormula"); % This description is shown as help to user. Modify it
to appropriate description.

%defineArgument(writeFormulaDefinition, "row", "int32");
%defineArgument(writeFormulaDefinition, "col", "int32");
%defineArgument(writeFormulaDefinition, "expr", <MLTYPE>, <SHAPE>); % '<MLTYPE>' can
be int8,string, or char
%defineArgument(writeFormulaDefinition, "format", "clib.libxl.libxl.Format", "input", "input"
<SHAPE>);
%defineOutput(writeFormulaDefinition, "RetVal", "logical");
%validate(writeFormulaDefinition);
```

FIG. 20

C++ Code:

double cv::Matx<float, 2, 1>::ddot(cv::Matx<float, 2, 1> const & v) const
typedef Matx< float, 2, 1 > cv::Matx21f

MATLAB definition

C++ class cv::Matx<float, 2, 1> with MATLAB name clib.tpm.cv.Matx21f
Matx21fDefinition = addClass(libDef, "cv::Matx<float, 2, 1>", "MATLABName", ...
    "clib.tpm.cv.Matx21f", ...
    "Description", "clib.tpm.cv.Matx21f    Representation of C++ class cv::Matx<float, 2, 1>"); % This description is shown as help to user. Modify it to appropriate description.

ddotDefinition = addMethod(Matx21fDefinition, ...
    "double cv::Matx<float, 2, 1>::ddot(cv::Matx<float, 2, 1> const & v) const", ...
    "Description", "clib.tpm.cv.Matx21f.ddot    Method of C++ class cv::Matx<float, 2, 1>::ddot"); % This description is shown as help to user. Modify it to appropriate description.
defineArgument(ddotDefinition, "v", "clib.tpm.cv.Matx21f", "input");
defineOutput(ddotDefinition, "RetVal", "double");
validate(ddotDefinition);

FIG. 21

```
// Comment unrelated to "HersheyFonts"
```

//!  Only a subset of Hershey fonts
//!<http://sources.isc.org/utils/misc/hershey-font.txt> are supported
enum HersheyFonts {
    FONT_HERSHEY_SIMPLEX          = 0,  //!< normal size sans-serif font
    FONT_HERSHEY_PLAIN            = 1,  //!< small size sans-serif font
    FONT_HERSHEY_DUPLEX           = 2,  //!< normal size sans-serif font
    (more complex than FONT_HERSHEY_SIMPLEX)
    FONT_HERSHEY_COMPLEX          = 3,  //!< normal size serif font
    FONT_HERSHEY_TRIPLEX          = 4,  //!< normal size serif font (more
    complex than FONT_HERSHEY_COMPLEX)
    FONT_HERSHEY_COMPLEX_SMALL    = 5,  //!< smaller version of
    FONT_HERSHEY_COMPLEX
    FONT_HERSHEY_SCRIPT_SIMPLEX   = 6,  //!< hand-writing style font
    FONT_HERSHEY_SCRIPT_COMPLEX   = 7,  //!< more complex variant of
    FONT_HERSHEY_SCRIPT_SIMPLEX
    FONT_ITALIC                   = 16  //!< flag for italic font
};

FIG. 22

```
>> help clib.OpenCV.cv.HearsheyFonts clib.OpenCV.cv.HearsheyFonts    Only a subset of Hershey fonts
<http://sources.isc.org/utils/misc/hershey-font.txt> are supported
Representation of C++ enumeration cv::HearsheyFonts Enumeration Summary:
    FONT_HERSHEY_SIMPLEX    0
        normal size sans-serif font
    FONT_HERSHEY_PLAIN    1
        small size sans - serif font
    FONT_HERSHEY_DUPLEX    2
        normal size sans - serif font(more complex than
FONT_HERSHEY_SIMPLEX)
    FONT_HERSHEY_COMPLEX    3
        normal size serif font
    FONT_HERSHEY_TRIPLEX    4
        normal size serif font(more complex than FONT_HERSHEY_COMPLEX)
    FONT_HERSHEY_COMPLEX_SMALL    5
        smaller version of FONT_HERSHEY_COMPLEX
    FONT_HERSHEY_SCRIPT_SIMPLEX    6
        hand - writing style font
    FONT_HERSHEY_SCRIPT_COMPLEX    7
        more complex variant of FONT_HERSHEY_SCRIPT_SIMPLEX
    FONT_ITALIC    16
        flag for italic font
```

EXTERNAL CODE INTEGRATIONS WITHIN A COMPUTING ENVIRONMENT

DESCRIPTION OF DRAWINGS

FIGS. 4A-4C, 5A-5F, 6A-6B, 7A-7B, 8A-8E, 9A-9B, 10A-10B, and 11-13, along with FIGS. 3A-C, describe examples of determining and resolving under-specifications resulting from the integration of external code within a computing environment for various entities.

FIG. 14 is an illustration of a table of example mappings between external code elements and internal environment elements.

FIGS. 16-23 are illustrations of examples of external code parsed and mapped to internal code of a computing environment.

DETAILED DESCRIPTION

Figure 1:
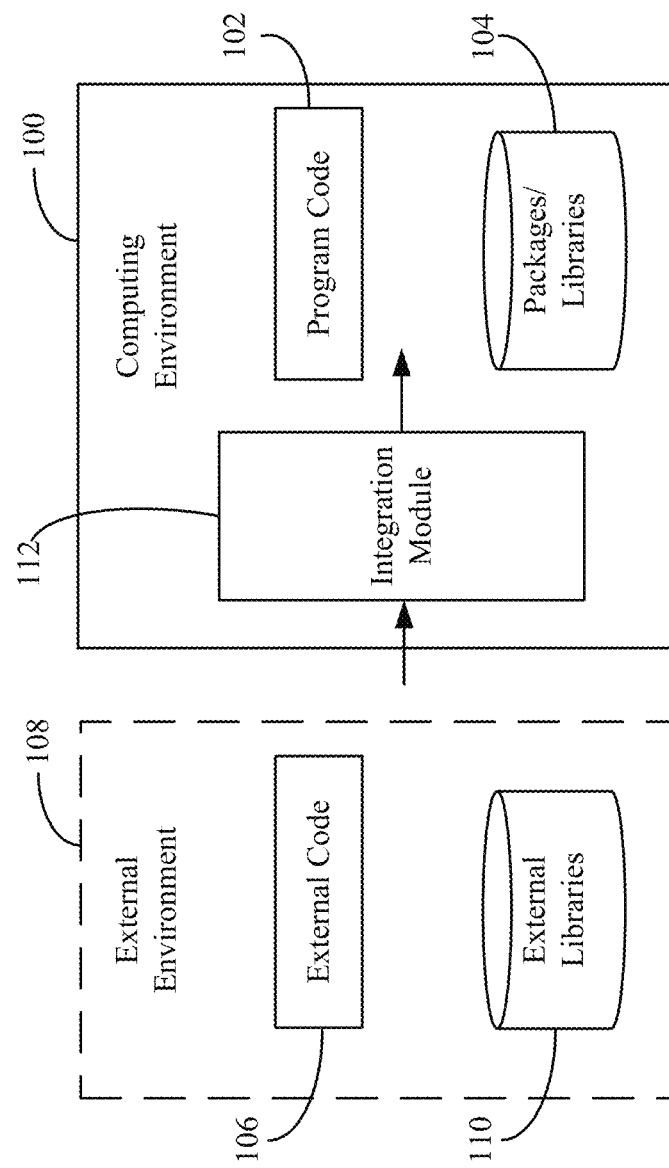
FIG. 1 is an illustration of an example of a system for program code integration.

A portion of the disclosure of this patent document contains material that is subject to copyright protection. The copyright owner has no objection to facsimile reproduction by anyone of the patent document for the patent disclosure, as it appears in the United States Patent and Trademark Office patent file or records, but otherwise reserves all copyright rights whatsoever. Copyright © 2018 The MathWorks, Inc.

In one aspect, in general, a computing system for processing external code that is not native to a computing environment includes: a user interface system, configured to provide information to a user, and configured to receive response information from a user in response to the provided information; and a processing system, including at least one processor, configured to process the external code, the processing including: parsing the external code to identify a first semantic entity, mapping the first semantic entity to a second semantic entity associated with the computing environment, the first semantic entity comprising a first set of one or more specified attributes and the second semantic entity comprising a second set of one or more attributes that are capable of being specified, determining that at least a first attribute of the second set of one or more attributes does not have a corresponding specified attribute within the first set of one or more specified attributes, determining available information for specifying the first attribute of the second set of one or more attributes, providing the available information to the user interface system for providing to a user for selection or specifying the first attribute of the second set of one or more attributes, and storing the second semantic entity in association with the first attribute of the second set of one or more attributes specified based on the user selection or specifying.

Aspects can include one or more of the following features.

The processing further comprises generating a user interface element for the second semantic entity and storing the user interface element in a library of the computing environment.

The processing further comprises generating a user interface element for the second semantic entity and using the user interface element in program code developed in the computing environment.

The user interface element comprises a graphical element in a graphical programming canvas environment, or a textual symbol callable from the computing environment.

The first attribute of the second set of one or more attributes comprises: a fixed point datatype, a sample rate, an input/output scope, an attribute indicating pass-by-reference or pass-by-value, an attribute indicating read-before-write or write-before-read, an attribute indicating a mutable or immutable property, an attribute indicating a side-effect-full or side-effect-free nature of a function, array or matrix dimensions, a thread-safety property, or an exception throwing behavior.

The processing further comprises debugging the first entity using the second semantic entity in the computing environment.

The processing further comprises generating code for the first entity using the second semantic entity.

The processing further comprises performing cross-domain optimization across the first and second semantic entities.

The cross-domain optimization comprises: inlining, data copy minimization, retargetable code generation, static analysis, property proving, modified condition/decision coverage (MC/DC), decision coverage, test vector generation, report generation, requirements linking, certification checking, continuous integration (CI) tool support, or identification or merging of differences.

The second semantic entity comprises: a named function associated with at least one input parameter or output parameter, a named variable associated with storage of a corresponding type, a named semantic category associated with a class or service, or a keyword associated with a type of a variable or parameter or associated with functionality for a semantic entity.

The second semantic entity comprises: a rate, a constant, a reference, a type, a structure, a state, or a service port.

The processing further comprises integrating documentation associated with the first semantic entity into documentation associated with the second semantic entity.

In another aspect, in general, a method for processing external code that is not native to a computing environment includes: parsing the external code to identify a first semantic entity, mapping the first semantic entity to a second semantic entity associated with the computing environment, the first semantic entity comprising a first set of one or more specified attributes and the second semantic entity comprising a second set of one or more attributes that are capable of being specified, determining that at least a first attribute of the second set of one or more attributes does not have a corresponding specified attribute within the first set of one or more specified attributes, determining available information for specifying the first attribute of the second set of one or more attributes, providing the available information to a user interface system for providing to a user for selection or specifying the first attribute of the second set of one or more attributes, and storing the second semantic entity in association with the first attribute of the second set of one or more attributes specified based on the user selection or specifying.

In another aspect, in general, one or more non-transitory computer-readable media have stored thereon instructions for processing external code that is not native to a computing environment, where the instructions, when executed by a computing system, cause a computing system to perform operations comprising: parsing the external code to identify a first semantic entity, mapping the first semantic entity to a second semantic entity associated with the computing environment, the first semantic entity comprising a first set of one or more specified attributes and the second semantic entity comprising a second set of one or more attributes that are capable of being specified, determining that at least a first attribute of the second set of one or more attributes does not have a corresponding specified attribute within the first set of one or more specified attributes, determining available information for specifying the first attribute of the second set of one or more attributes, providing the available information to a user interface system for providing to a user for selection or specifying the first attribute of the second set of one or more attributes, and storing the second semantic entity in association with the first attribute of the second set of one or more attributes specified based on the user selection or specifying.

In another aspect, in general, a method includes: generating second code for first code that includes third code that is native to a computing environment and fourth code that is external to the computing environment, the fourth code being integrated and represented by fifth code native in the computing environment, and the generating comprising: identifying a semantic entity of the fifth code, mapping the semantic entity of the fifth code to a semantic entity of the fourth code based on a mapping from the semantic entity of the fourth code to the semantic entity of the fifth code, the mapping comprising determining that a corresponding attribute of at least one attribute of the semantic entity of the fifth code does not exist or is to be underspecified in the semantic entity of the fourth code, and generating the second code based on the mapping the semantic entities of the fifth code and the fourth code.

Aspects can include one or more of the following features.

Generating the second code comprises generating a function call to the fourth code.

Generating the second code comprises generating code for the third code and including the function call with the code generated for the third code.

Generating the second code comprises in-lining the fourth code in the generated second code.

The fourth code comprises at least one of: C, C++, C #, Java®, FORTRAN, Python, Visual Studio®.

1 Overview

FIG. 1 is an illustration of an example of a system for program code integration. A computing environment 100 can be a textual environment, a graphical environment, or a hybrid environment in which both textual and graphical programming are supported. Examples of such an environment can include a modeling and/or simulation environment, and a technical computing environment. Within the computing environment 100, program code 102 in one or more languages native to the computing environment 100 can be compiled and/or executed. An example of such program code 102 can be code that implements a program in the form of an executable model. Some program code in the computing environment 100 can be organized within packages/libraries 104, which may be used to execute, interpret, or otherwise run software developed using the computing environment 100. The program code 102 can include textual code, graphical code, or a combination thereof. The packages/libraries 104 may include, for example, sets of code, libraries, interfaces, and other data related to software developed using the computing environment 100.

The computing environment 100 may, for example, be the MATLAB® language/programming environment and the Simulink® model-based simulation and design environment, both MATLAB® and Simulink® being from The MathWorks, Inc. of Natick, Mass. Other examples platforms that can be used to provide the computing environment 100 include: OpenCV, AWS SDK for C++, OpenDDS, ZeroMQ, Qt, Halide, TensorFlow C++ API, Pytorch C++ API, Caffe, CImg, Libtiff, Crypto++, Tesseract, FreeImagePlus, LibXL, Tonic, Botan, and Tensorflow. Other environments can include, for example, the Simscape physical modeling system and the Stateflow® state chart tool also from The MathWorks, Inc., the MapleSim physical modeling and simulation tool from Waterloo Maple Inc. of Waterloo, Ontario, Canada, the LabVIEW virtual instrument programming system and the NI MatrixX model-based design product from National Instruments Corp. of Austin, Tex., the Keysight VEE graphical programming environment from Keysight Technologies, Inc. of Santa Clara, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, and the System Generator system from Xilinx, Inc. of San Jose, Calif. Additional environments can be environments that support languages such as the C, C++, C #, and SystemC programming languages.

Programs developed with the computing environment 100 can use external code 106. In some cases, the external code 106 may have been developed within or otherwise using an (optional) external environment 108. The external environment 108 is, in this example, a development environment external to the computing environment 100. For example, the external environment 108 may refer to an integrated development environment that supports one or more coding languages (e.g., C, C++, C #, Java®, FORTRAN, Python, Visual Studio®, etc.). Examples of the external environment 108 can also include any of the example environments described as examples for the computing environment 100 above. External code can be in the form of one or more external libraries 110 or can contain instances of elements of the external libraries 110. The external code 106 may be written in a coding language that is native to (e.g., supported by, executable within, or compatible with) the external environment 108. In some implementations, the external code 106 is not necessarily provided from an integrated development environment such as the external environment 108, but may be provided from any source external to the computing environment 100.

The computing environment 100 includes an integration module 112, which is configured to integrate external code 106 into the computing environment 100. The integration module 112 is able to generate program code 102 that provides the functionality of the external code 106 in a manner that is more fully specified according to attributes that are native to the computing environment 100. In some cases, external code within the external library 110 may be processed by the integration module 112 and provided within packages/libraries 104. In some cases, the languages that are native to the computing environment 100 may be different from the languages that are native to the external environment 108. For example, the external code 106 may be written in a language that is not native to the computing environment 100. While the terms external and non-native may be used interchangeably, and the terms internal and native may be used interchangeably, for convenience a language or code that is not native to the computing environment 100 may be referred to herein as "external" and a language or code that is native to the computing environment 100 (such as program code 102) may be referred to herein as "internal."

The integration module 112 can be implemented as software that integrates external code 106 or external libraries 110 from the external environment 108 into the computing environment 100. For example, the integration module 112 can map semantic entities (e.g., function calls, global variables, states, etc.) of the external code 106 to semantic entities of the program code 102. The integration of the external code 106 using the integration module 112 can allow development of program code 102 in the computing environment 100 to take advantage of existing external code 106 without requiring reprogramming within the computing environment 100 to perform the same functionalities of the external code 106. For example, existing numerical or simulation libraries in various programming languages external to the computing environment 100 can be integrated into the computing environment 100 for programming usage. Example platforms that may have libraries that can be integrated can include: OpenCV, AWS SDK for C++, OpenDDS, ZeroMQ, Qt, Halide, TensorFlow C++ API, Pytorch C++ API, Caffe, Clmg, Libtiff, Crypto++, Tesseract, FreelmagePlus, LibXL, Tonic, or Botan, OpenCV, OpenDDS, and Tensorflow. Some of the libraries are highly optimized or known for performing certain functionalities, such as deep learning, computer vision, or encryption, within the respective external environments. Integration allows incorporation of some of the advantages of these libraries, which can be time/resource consuming to construct within the computing environment 100, or may not be suitable to be constructed due to the design of the computing environment 100. Additionally, the integration can also facilitate distributed program development, e.g., in a cloud-based environment or within an organization or other situations, possibly using different programming environments, and the program developed can be integrated at a system level. Examples of such use can include co-simulation in the computing environment 100 or system engineering in the computing environment 100. The integration module 112 can integrate the external code 106 and/or external library 110 directly into program code 102 being developed within the environment 100, or alternatively, into a packages/libraries 104 native to the computing environment 100 such that elements within the library can be used natively within the computing environment 100. Semantic entities of languages of the external code 106 can be mapped to semantic entities of languages internal to the computing environment 100, and wrappers can be formed around external libraries (e.g., the external libraries 110) and/or around the external code 106 to implement the semantic entity mapping.

The external code 106 may include a variety of different kinds of semantic entities. The semantic entities are code elements that are used to implement functionality within the code. Examples of semantic entities include rates (e.g., sample rate), constants, references, pointers, types and structures, states, global variables (e.g., as function input/output arguments), and the like. The structure and format of the semantic entities are indicated using attributes of those semantic entities. For example, an attribute of a semantic entity may refer to an argument, parameter, variable, or other element of the semantic entity which is used by the semantic entity during the execution thereof. The attributes of the semantic entities within the external code 106 may in some cases be common to languages internal to the computing environment 100. For example, the computing environment 100 and the external environment 108 may both support a coding language that uses, as a semantic entity, a function call (e.g., void foo(x, y, z)) having the attributes of an input argument, an output argument, and a parameter. In such a case, the integration module 112 does not need to perform mapping for the external code 106 to function within the computing environment 100. However, the semantic entities within the external code 106 may not map directly to corresponding entities in the computing environment 100. As such, the attributes within the semantic entities of the external code 106 may need additional annotation (such as fixed-point radix specification for an integer data) within the computing environment 100. The integration module 112 resolves situations such as these by determining how to map those semantic entities and under-specified attributes such as fixed-point data types to native semantic entities and their attributes of the computing environment 100.

The integration module 112 processes the external code 106 to identify semantic entities within the external code and their respective attributes, and corresponding semantic entities of the environment 100 that are capable of providing the same or equivalent semantic meaning to those of the external code 106. The integration module 112 parses the external code 106 to identify semantic entities within the external code 106 and then maps the external semantic entities and/or the attributes thereof from the external code 106 to internal semantic entities and/or attributes thereof native to the computing environment 100.

In some implementations, the integration module 112 parses the external code 106 to determine whether information regarding how to map a given semantic entity and the attributes thereof from the external code 106 to the computing environment 100 is specified within the external code 106. For example, the information can be obtained or derived where the external code 106 includes code that indicates how to use the semantic entity and the attributes thereof. For example, where the external code 106 includes a function (the external semantic entity) that has three arguments, the context for the function (e.g., the syntax used to call the function, the types and placement of arguments, and/or any embedded comments), may be analyzed to determine that one argument is an input, one argument is a parameter, and one argument is an output. By analyzing the external semantic entity and its context in this manner, an internal semantic entity and the attributes thereof may be specified. The integration module 112 computes a default specification of the internal semantic entity with the attributes of the internal semantic entity configured based on a rule set (e.g., const pointers are inputs etc.). Part or all of this default specification of the internal semantic entity can be overridden in the computing environment 100. For example, the overriding can be performed manually, or via decorations in the external representation. For example, comments in external code may include information about the semantic mapping to an internal code representation.

In some implementations, the integration module 112 performs parsing, mapping, and interface generation processes to integrate external source code in external code 106 by compiling the external source code into an executable (e.g., exe files, dynamic-link libraries (DLLs), etc.), or when provided an executable in external libraries 110, by wrapping the executable with an interface wrapper in order to access the wrapped executable in the computing environment 100. The parsing and mapping functionality of the integration module 112 parses the external code 106 to identify external semantic entities and attributes thereof within the external code 106 and then maps those identified external semantic entities to internal semantic entities supported by the environment 100.

However, in some cases, a given semantic entity and/or one or more attributes from the external code 106 may be under-specified, such that the use or purpose of the given semantic entity and/or one or more attributes thereof from the external code 106 for performing a particular functionality in the computing environment 100 is not readily clear to the computing environment 100. The occurrence of an under-specification indicates that the integration module 112 lacks some or all of the information necessary for mapping the given external semantic entity or attribute thereof to an internal semantic entity or attribute native to the computing environment 100. The integration module 112, upon detecting an under-specification (e.g., by pre-set default rules, or manually by the user, or by information that is provided in addition or as part of the external representation), identifies possible mappings for characterizing the underspecified semantic entity. The integration module 112 presents those possible mappings, such as for manual user review through a user interface system (e.g., using a user interface window that lists some or all of the possible mappings for selection, for example, by a user of the computing environment 100). The integration module 112 can use response information received through the user interface system to resolve the under-specification. Alternatively, or where no responsive information is received, the integration module 112 may refer to predetermined information available to the computing environment 100 to resolve the under-specification.

In some implementations, the integration module 112 can be used in connection with other operations supported by the computing environment 100 or external to the computing environment 100. For example, the operations may be one or more of code coverage reporting based on the program code 102, test vector generation, code testing, code debugging, or consistency checking of mappings of the external code 106 to entities of the computing environment 100. The operations can not only be performed on the native code of the computing environment 100, but also the external code 106 that is integrated through the integration module 112, without which the same operations cannot be readily available for the external code 106. For example, an external C++ library can be integrated and debugged using the debugging tools that are uniquely available in connection with the computing environment 100, but may not be readily available for C++ program code. In addition, other operations supported by the computing environment 100 such as requirements linking, report generation, coverage (statement, decision, MC/DC, toggle), optimization, static analysis, property proving, and automatic test vector generation can be performed on the integrated external code and are operations that are not always available in the external environment 108.

The integration module 112 is shown as software included within the computing environment 100. However, in some implementations, the integration module 112 may be located outside of the computing environment 100. For example, the integration module 112 may be part of a pre-processing environment that receives information from the external environment 108 and processes that information before transmitting that information to, or otherwise making that information available within, the computing environment 100. In some such implementations, the integration module 112 can be implemented as a plug-in or other software addition available for use in connection with the computing environment 100.

Examples of the external environment 108 or of other possible sources of the external code 106 that could be integrated include: OpenCV, AWS SDK for C++, OpenDDS, ZeroMQ, Qt, Halide, TensorFlow C++ API, Pytorch C++ API, Caffe, Clmg, Libtiff, Crypto++, Tesseract, FreelmagePlus, LibXL, Tonic, or Botan. In some implementations, documentation (e.g., comments associated with external code to be integrated) can be integrated with the external code to improve the readability of the integrated external code. For example, the documentation may be or otherwise include documentation about the functionality of the external code or portions thereof, documentation relating to systems for using the external code, documentation regarding how semantic entities within the external code are to be used or otherwise integrated within the computing environment 100, or the like.

Figure 2:
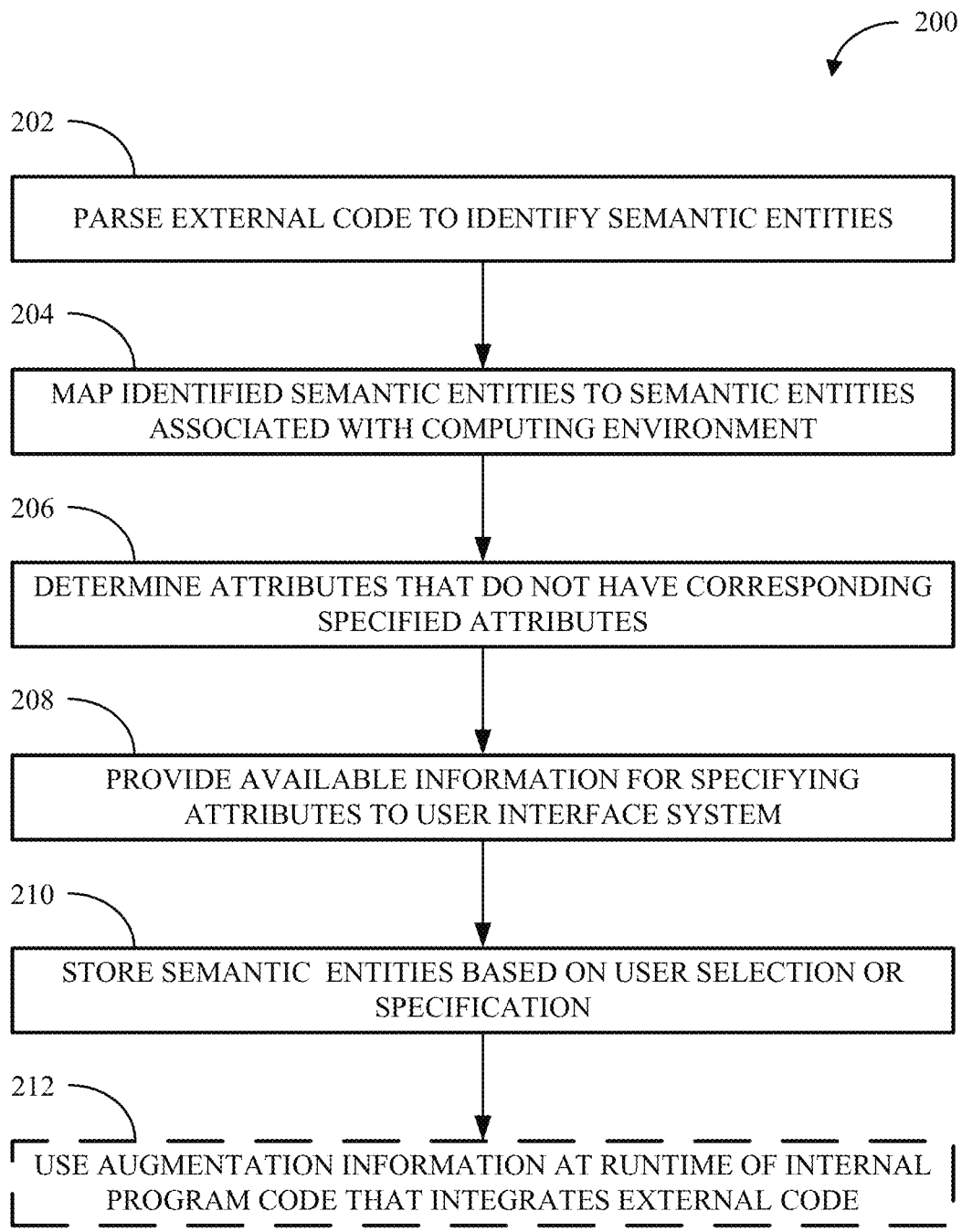
FIG. 2 is a flowchart of an example process for integrating external code within a computing environment.

FIG. 2 is a flowchart of an example process 200 for integrating external code in the computing environment 100. Various attributes of the external semantic entities of the external code (e.g., the external code 106) may be mapped to corresponding attributes of internal semantic entities (e.g., parameters, variables, keywords, etc.) that are native to the computing environment 100. The internal semantic entities can be made available for use in the computing environment 100. For example, the internal semantic entities can be made available as library entities that can be instantiated in native user programs, or that can be directly used in a user program in the computing environment 100.

At 202, the external code is parsed, e.g., by the integration module 112 of FIG. 1, to identify semantic entities. The semantic entities of the external code may, for example, include: a named function with at least one input, output, parameter, or other attribute; a named variable with at least one value of a particular variable type; a named semantic category (e.g., a rate, object, const, etc.) associated with a class (e.g., an object class) or a service (e.g., a service implemented using one or more variables, object classes, etc.); a keyword associated with a type of variable, parameter, function, or other semantic category. Parsing the external code to identify the semantic entities may include identifying symbols within the external code and processing the identified symbols by using the native computing environment's symbol resolution scheme (e.g., hierarchical scoping based, naming convention based, etc.) to determine that the symbols are related to the semantic entities. In some implementations, how the symbols are used within the external code may be determined according to semantic meaning of the symbols used.

At 204, the semantic entities identified within the external code are mapped to internal entities associated with the computing environment 100. The internal semantic entities may include various attributes in a language of native code of the computing environment 100. For example, the input arguments, output arguments, and/or parameters of the external code 106 may be mapped to the semantically equivalent entities/language elements of the computing environment 100.

In some implementations, mapping an external semantic entity to an internal semantic entity includes identifying the attributes common to the external semantic entity and the internal semantic entity (e.g., name of a symbol, whether a function argument is input or output, type of a variable such as integer, double precision etc.). The integration module 112 may implement rules to determine mappings between the external code and the internal code. Examples of rules may include, but are not limited to: variable types such as doubles and floats may have a one-to-one mapping, integers by default map to integers but in some cases may map to fixed point types, enum types have a one-to-one mapping to a custom created model of enum type, struct types map to a custom created model of bus type, etc. The rules can be defined within the computing environment 100, defined by a user, or may be predetermined within the integration module 112, for example. The integration module 112 can use the rules to determine what semantic entities to map within the external code and how to map those semantic entities.

At 206, under-specified attributes associated with internal semantic entities that do not have corresponding specified attributes associated with the mapped external semantic entities are determined. The under-specified attributes may be associated with aspects of the identified external semantic entities which do not contain all of the information that would be needed by the internal semantic entities for use in the computing environment 100. For example, an under-specified attribute may be or include a function argument (e.g., an input argument, an output argument), a rate, a const, a reference, a type or structure, a state, a global variable, a pointer, or another element of an internal semantic entity which needs to be specified in order for the internal semantic entity to be usable in the computing environment 100.

A semantic entity from the external code may have one or more under-specified attributes. The under-specification associated with a given attribute may be caused by one of a number of occurrences. One example of an occurrence which causes an under-specification is the difference between the language capability of the external code and the language capabilities supported by the computing environment 100. In some cases, a mismatch that may lead to under-specification may occur if the semantic entities and attributes of those semantic entities of the native language(s) supported within the computing environment 100 are not supported by any given entity or attribute thereof from the external code. For example, the external code (e.g., C++ code) and internal code used within the computing environment 100 may both support double variables. However, the external code may not support fixed point integers, while the internal code used within the computing environment 100 does. In another example, the external code may include elements (e.g., Autosar component interface specification) expressing a time for code execution, but may not support the concept of sample rate used within the computing environment 100. There are a variety of ways in which the external code may be written that causes portions thereof to be under-specified within the computing environment 100. For example, a user-defined object or class within the external code may be written in a way (e.g., missing const specifiers on a class method even though the method may not have any side-effects) that prevents the integration module 112 from accurately parsing and mapping the external code.

The under-specified attributes can be determined by examining the external code, using metadata or other information indicative of known mismatches based on the language of the external code, and/or using metadata or other information indicative of prior executions of other external code having a similar under-specified attribute. Examining the external code can include or otherwise refer to the parsing and mapping operations described above. Alternatively, or additionally, examining the external code can include a manual examination of the external code. For example, a portion of the external code suspected to include an under-specified attribute can be flagged for user review. The metadata or other information indicative of the known mismatches, or of the prior executions of the other external code, can be metadata or other information which has been stored in a knowledgebase or other library of the computing environment 100. For example, metadata or other information may include a collection of file logs indicating the under-specified attributes determined within prior external code or indicating known entities or elements which cause mismatches within the computing environment 100. Metadata or other information may indicate that external code having a given format (e.g., a set of symbols with a certain structure) and under-specified attribute(s) can be mapped to a function with persistent state within the computing environment 100. Such metadata or other information can be used to determine that other external code having the same format is a same kind of under-specified attribute.

In some implementations, the mismatch takes place in situations in which the external code does not support programming capabilities of internal code of the computing environment 100 (e.g., forward declared incomplete types for pointers used in structures such as linked lists in external code). Identifying the mismatch can allow for the integration module 112 to prompt the user to make modifications to the exposed interface of the external code to make it digestible by the computing environment 100.

After identifying the set of under-specified semantic entities in the external code, the user may have a choice of accepting the default mapping by the integration module 112 or augmenting the default mapping by providing additional attributes to the integration module 112, for example, via a graphical user interface (dialog box) or command line API. At 208, available information for specifying attributes, such as at least some of the information characterizing the mapping of the external semantic entities to the internal semantic entities and/or at least some of the information characterizing the under-specified attributes determined based on the mapping, is provided to a user of the computing environment 100, for example, through a user interface system. The user interface system may be a system that includes a user interface through which communications may be enabled between a user of the computing environment 100 and an integration module thereof (e.g., the integration module 112). The information, or parts thereof, characterizing the under-specified attributes may be presented as the content of a window, for example, a prompt, delivered to the user of the computing environment 100. The information characterizing the under-specified attributes may indicate one or more options for the under-specified attributes.

For example, where the under-specified attribute is determined to be related to function argument mapping, the integration module may generate one or more options for specifying each of an input argument, an output argument, or a parameter of a function from the external code. The user receiving the information characterizing the under-specified attributes may, for each of the under-specified attributes, review the options and select the option that best classifies the under-specified attribute. In some implementations, where none of the options are appropriate, the user may be permitted to provide a custom response which differs from any of the presented options for the under-specified attribute.

In some cases, some of the options presented through the window may be read-only. For example, attributes of the internal semantic entity other than the under-specified attribute can be displayed in the window for the user to view, such as to assist with the selection of the option for resolving the under-specification or to otherwise report specified information for the internal semantic entity. For example, an attribute of a function which is understood to be an input argument may be presented as read-only. Furthermore, in some cases, the options presented through the window used to resolve the under-specification associated with the under-specified attribute may represent only a subset of the options determined by the integration module. That is, not all of the options for resolving the under-specification may be presented to the user for selection. For example, the integration module can use information about the task to be performed by the external code within the computing environment 100 to determine whether certain options are less probable for resolving the under-specification. The computing environment 100 may contain a dictionary of the various mapping options, which can be presented to the user to help with the mapping/augmentation of under-specified external code semantic entities.

At 210, internal semantic entities that may have been augmented using augmentation information determined based on a response to the information provided to the user interface system are stored. For the purpose of description, the response to the information provided to the user interface system may be referred to as response information. The response information represents the feedback of the user of the computing environment 100 for defining the uses and values of the under-specified attributes (e.g., a selection or specifying of under-specified attributes). The augmentation information may be or be generated based on the response information. Alternatively, where no response information is received in response to the information characterizing the under-specified attributes, the augmentation information may be or be based on predetermined information associated with the under-specified attributes. The predetermined information may be learned information, for example, obtained through prior mappings or user specifications which were used to resolve previously identified under-specified attributes. The predetermined information may be stored in the computing environment 100, within the external code, or in another location accessibly by the integration module for use in subsequent external code integration operations.

The augmentation information includes information in a form, e.g., symbolic and/or structural form, usable or supported by the computing environment 100 and corresponding to those under-specified attributes. The augmentation information can be specific to the type of the internal semantic entity. For example, where a function call from the external code is mapped to an internal semantic entity, without specifying a sample-rate for executing the function/making the function call, the augmentation information can indicate a specific rate for executing functions within the external code. The augmentation information would thus reflect how often the function is to be executed when used in the computing environment 100. In another example, wherein the external semantic entity is mapped to a pass-by-pointer argument, the augmentation information can indicate that the pointer points to an output argument. In some implementations, the internal semantic entities may be compiled with the augmentation information and the compiled code may be stored in a dynamic link library (DLL) file or another library.

The process 200 may end after step 210, which may occur before runtime, or the process may optionally perform one or more steps during runtime. Optionally, at 212, the augmentation information is used at a runtime of the internal program code that integrates external code. For example, the augmentation information may be stored as pointers or other references to specific portions of a library within a package (e.g., a DLL file or a shared object file). The package may further include a compiled or interpretable version of the external code. At runtime of the compiled or interpretable version of the external code, the computing environment 100 executes the internal code, which includes the internal semantic entities and uses the augmentation information (e.g., through pointers exported from the library within the package).

2 Simulation Environment

Referring again to FIG. 1, program code 102 may be graphically represented in any of a variety of graphical forms, depending on the type of modeling being performed. For example, program code 102 can be represented as a block diagram, where blocks of the block diagram can represent subsystems or individual components. In some implementations, one or more elements of the program code 102 can make use of the external code 106 which is not native to the computing environment 100. The external code 106 can be compiled into executable code in an exported library, for example, one of the external libraries 110. The exported library may then be integrated for use within computing environment 100. In some cases, the external code 106 can be integrated into the computing environment 100 in an uncompiled form and later compiled within or otherwise using the computing environment 100.

The packages/libraries 104 may be generated for the external code 106 after the external code 106 is integrated using the integration module 112. The packages/libraries 104 may include executable code representing an executable version (e.g., a compiled or interpretable version) of the external code 106. The packages/libraries 112 may further include interface information (e.g., in the form of data structures that are used by the computing environment 100 when a user thereof uses the integrated external code 106, noting, however, that the user of the computing environment 100 does not need to know of the external code 106 or otherwise use the external code 106 after the external code 106 has been integrated using the integration module 112. In some implementations, the packages/libraries 104 can be included in one or more libraries of the computing environment 100. In some implementations, the packages/libraries 104 can have a display component, for example, a graphical display such as a block, which is indiscernible from other native library components of the computing environment 100. For example, the interface information can be used at the runtime (e.g., during the simulation or code execution within the computing environment 100 or on hardware outside of the computing environment 100) of the compiled code to verify that the executed integrated code functions correctly (e.g., that the data types conform, the data ranges conform, etc.), and that the outputs are correctly captured.

In some implementations, internal semantic entities to which aspects of the external code 106 are mapped can be graphically represented as interface elements, e.g., graphical model elements/components, of the computing environment 100. For example, the computing environment 100 may include a graphical editor in which interface elements may be configured, such as to form user-identifiable icon (e.g., a graphical block or a textual icon). For example, the integration module 112, after integrating the external code 106, may additionally generate an interface element for a semantic entity mapped from the external code 106. The user of the computing environment 100 may use that generated interface element in the graphical editor of the computing environment 100.

In addition to the semantic, symbolic, and/or structural mapping and interface generation described above, in some implementations, the integration module 112 may also convert data storage formats between those used with the external code 106 and those used with internal code of the computing environment 100. For example, .cpp data types for external C++ code written in an environment that supports C++ development can be converted to .slx data types usable within the computing environment 100, .m data types usable within the computing environment 100, or other data types. In some implementations, the data type conversion is performed to implement in the computing environment 100, for example, a matrix majority scheme, a structure type padding scheme, or another scheme used for processing the external code. For example, if an OpenCV image is to be mapped to a computing environment 100 image of a different underlying format, data type conversion is implemented. In another example, if a user-defined entity (e.g., data, class, object, or another entity) in the external code 106 is to be mapped to an entity transparently handled (e.g., using pre-coded default rules for interpretation and execution) by the computing environment 100, the user may override the default rules by registering the conversion routines to convert the representation of the user-defined entity within the external code 106 to the domain-specific representation of the computing environment 100.

The computing environment 100 can enable various forms of simulation and/or modeling such as simulating real world systems represented by models which correspond to the program code 102, or analyzing certain behavior of those real world systems including time-domain and/or frequency domain behavior, and signal characteristics. Examples of such real world systems include, but are not limited to: systems that involve signal processing, such as those implemented in audio processing, image processing, video processing, or the like; communication systems, such as those implemented in telephone systems, network systems, mobile systems, other computer systems, or the like; control systems, such as those implemented in vehicles including cars, spacecraft, or the like; and physical systems, such as those implemented in machinery, circuits (e.g., electrical or otherwise), thermodynamic systems, or the like. At least some of the real world systems include hardware modules and software implemented on certain parts of the hardware modules for controlling those systems. At least some of the real world systems may be hardware modules within accompanying implemented software.

3 Exemplary Implementations within a Simulation Environment

Figures 3A, 3B, 3C:
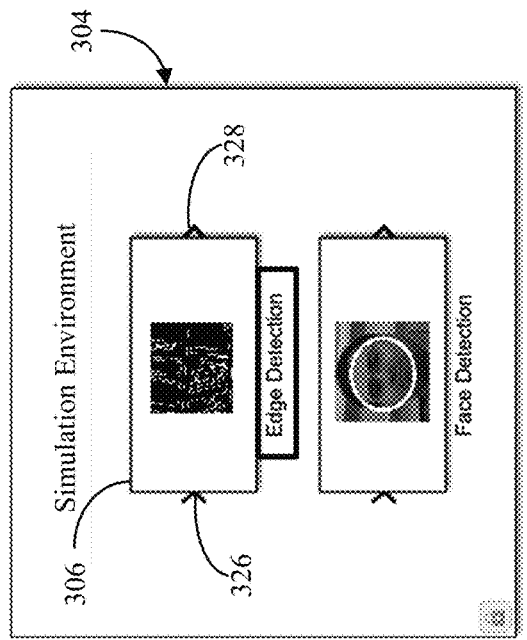
FIGS. 3A-C are example code, user interfaces, and models relating to the mapping of elements of external code function semantic entity to elements of a model executable within a simulation environment.

FIGS. 3A-C are illustrations of example code, user interfaces, and models relating to the mapping of elements of external code semantic entities to elements usable in a model executable within a simulation environment. The methods and systems described above can be used to integrate external code in one or more files in its entirety, or to integrate one or more parts of the external code, e.g., one or more functions or modules of the external code. Referring first to FIG. 3A, external code written in the C programming language is shown. The external code includes image processing routines 300 and 302. The image processing routine 300 contains the function edge detection, which has four arguments u, y, nRows, and nCols. Implementing the example processes and integration module described previously herein, the edge_detection function is integrated into a simulation environment 304, shown in FIG. 3C, as an element named as an Edge Detection block 306. One or more of the four arguments of the image processing routine 300 (e.g., nCols) may be determined to have under-specified attributes in the context of the Edge Detection block 306 that is being generated as the internal semantic entity.

The multiple functions in the external code of FIG. 3A can be integrated in the form of multiple semantic entities within environment 304. Referring next to FIG. 3B, a window 308 is presented within a user interface of a computing environment to communicate information characterizing the mapping of the function edge_detection from the image processing routine 300 shown in FIG. 3A and the identified elements thereof. By parsing and analyzing the function edge_detection from the image processing routine 300, an integration module (e.g., the integration module 112) identifies input argument 310, output argument 312, constant 314, and variable nCols 316. These identified attributes can be respectively mapped to input port 318, output port 320, constant 322, and under-specified attribute options 324. The window 308 enables a user of the computing environment to indicate which of those possible options represents the intended use of the under-specified attributes. For example, as shown in FIG. 3B, a user (e.g., as intended by a developer of the external C code) selects from a list of options including "input," "parameter," and "constant" to indicate the correct scope of the under-specified attribute associated with nCols.

The window 308 further includes a list of labels, types, and sizes for each of the four arguments. The mapping of the function edge_detection of the image processing routine 300 includes identifying labels of the arguments of that function which are used natively by the simulation environment, argument types of those arguments as used natively by the simulation environment, and sizes of those arguments as used natively by the simulation environment. The information identified by the mapping is extracted into the window 308 and populated in the appropriate locations. In the event that the expression of the function edge_detection of the image processing routine 300 within the external code shown in FIG. 3A does not specify aspects of one or more of the four arguments which can be used to determine the labels, types, and sizes thereof, those aspects can be determined to be under-specified attributes. Options for selecting the values for those under-specified attributes may be selectable using the window 308.

Referring next to FIG. 3C, an icon, for example, in the form a graphical block 306, is shown. The graphical block 306 may be a library block that can be used by a user of the simulation environment 304 to construct a model. The graphical block 306 represents the functionality of the function edge_detection of the image processing routine 300 as augmented based on response information received by a user through the window 308. The graphical block 306 includes a graphical input port 326 and a graphical output port 328. The graphical input port 326 represents the use of the input argument u 310 based on the input scope 318. The graphical output port 328 represents the use of the output argument y 312 based on the output scope 320. When the graphical block 306 is used, it is instantiated, and when the model that is constructed using the graphical block 306 is executed, the external code of the image processing routine 300 is executed in connection with the internal code of the simulation environment to which the external code of the image processing routine 300 is mapped. The augmentation information representing the response information received through the window 308 is stored in association with the graphical block 306. In some implementations, the response information may be captured specially, and the block may store the effect of the response information.

The external code shown in the C programming language in FIG. 3A is integrated into the simulation environment 304 to result in an internal semantic entity represented by the graphical block 306. Once augmented using the response information received through the window 308, the internal semantic entity does not need to be reprogrammed or otherwise changed within the simulation environment 304 to enable the functionality of an external semantic entity in the external code for the image processing routine 300. The integration of the external code for the image processing routine 300 within the simulation environment 304 can thus be done by generating a library block indiscernible from other library blocks. A user of the simulation environment 304 may thereafter benefit from the use of the integration without knowledge of the external code for the image processing routine 300.

FIGS. 4-13, along with FIGS. 3A-C, describe examples of determining and resolving under-specifications resulting from the integration of external code within a computing environment for various entities, such as by the performance of the process 200. First, function argument mapping of pass-by-pointer or pass-by-reference is explained with respect to FIGS. 3A-C. In the function edge_detection of the image processing routine 300, the arguments are specified as const unsigned char* u, unsigned char* y, double nRows, and double nCols, shown in the window 308 as the arguments 310, 312, 314, and 316, respectively. With respect to const unsigned char* u, taking into account the "const" qualifier, this argument is mapped to the input port 326 or to a parameter. Without the "const" qualifier, that argument can be mapped to the input port 326 or to a parameter (in either case with a warning write to an input buffer). Alternatively, without the "const" qualifier, the argument can be mapped to the output port 328 (such as if the pointed buffer is fully written) or to both of the input port 326 and the output port 328. This too is an under-specification. Furthermore, there is also an under-specification where an additional argument (i.e., not a pass-by-pointer or pass-by-reference argument) is a derived property of a pass-by-pointer or pass-by-reference argument. In such a case, the additional argument is mapped to "constant" and a prompt to a user is made for a value expression.

FIGS. 4A-C relate to example function argument mapping by function return or pass-by-value. FIG. 4A shows external code 400 which is a function double timesK. The function is of type double 402 and includes two variables, double u 404 and double K 406. Parsing the external code 400 results in mapping three arguments 408 of the function to a double type entity of the internal code of the computing environment 100. A window 410 is displayed to show the arguments 408 along with scope, label, type, and size values determined by the parsing and mapping. In FIG. 4B, a graphical block 412 for the function double timesK is shown. The function return value, a double, is mapped to output port 414 by default. A user can change the mapping to "void" if the return value is to be ignored. A function input argument which is passed-by-value can be mapped to input port 416, to a parameter, used by the graphical block 412, or to a constant used by the graphical block 412. This results in an under-specification when configured to "constant" such that a constant value expression has to be specified (e.g., as shown in FIGS. 3A-C). In FIG. 4C, a window 418 is displayed for a user to enter a value of the argument K 420, which is the variable 406.

Mapping techniques using function argument mapping other than those described with respect to FIGS. 3A-C and 4A-C may also or instead be used. In some implementations, the mapping information, e.g., generated in step 204 of FIG. 2, and the augmentation information, e.g., generated in the example of FIG. 2, can be used in generating code for the integrated external code with or without the native code in which the integrated external code is integrated. For example, code can be generated for a model that includes an instance of the integrated external code. The generated code can be used for simulation, deployment on embedded systems (such as ones in vehicles, controllers, etc.), or other usages. For example, the generated code can be C code, C++ code, or other code with some examples as described below. An existing code generator that automatically generates code for native code, e.g., program 102 or package/library 104 of FIG. 1, can be improved or adapted to utilize the mapping information and augmentation information for generating code for the integrated external code. An example of such an improved or adapted code generator can be code generator 2408 of FIG. 24. Without improving or adapting the existing code generator, the existing code generator may not be able to properly generate code for the integrated external code.

In some implementations, the code generated for the integrated external code is in the form of a function call (e.g., a call site) to call the external code, which can be in the form of executable code or in source code form. Alternatively, the code generated for the integrated external code can include code that performs the functionality of the external code. The code generated in this alternative manner can be optimized with code generated for the native code in which the external code is integrated. In either situation, the improved or adapted code generator accesses and evaluates the mapping information and augmentation information. For example, the evaluation can include mapping an identified semantic entity or entity attribute within the native environment to the semantic entity or entity attribute within the external code. Such a mapping can be performed based on the mapping information, e.g., generated in the example shown in FIG. 2. For example, when the improved or adapted code generator identifies input port u of FIG. 4B, the code generator maps it back to input of a function timesK, using the mapping information, such as indicated in FIG. 4A. In this example, when all semantic entities, entity attributes, augmented or not, are mapped back to the external code, the coder identifies the header file, e.g., function call prototype originated from the external code, e.g., as shown in FIG. 4A, and generates a proper function call (e.g., call site) to the external code. In certain situations, when additional attributes are augmented in the native environment and no corresponding attributes exist in the external code, the code generator identifies such additional attributes and perform the correct mapping. For example, if the generated code is in C language, the function call in this example can be: "model_Y.Out1=timesK(model_U.In1, 2.0)". Similarly, in the examples shown in FIGS. 3A-3B, the improved or adapted code generator can generate a function call: "edge_detection(&model_U_In1[0], &model_Y_Out1[0], 480.0, 640.0)" to call the external function 300.

Furthermore, as described previously, in some implementation, when the code generator has access to the source external code, the code generator may also generate code for the functionality of the external code, as opposed to merely a function call to the external code. The code generator can inline the source external code or regenerate the source external code that optimizes with other code that is generated for native program code.

Figure 27:
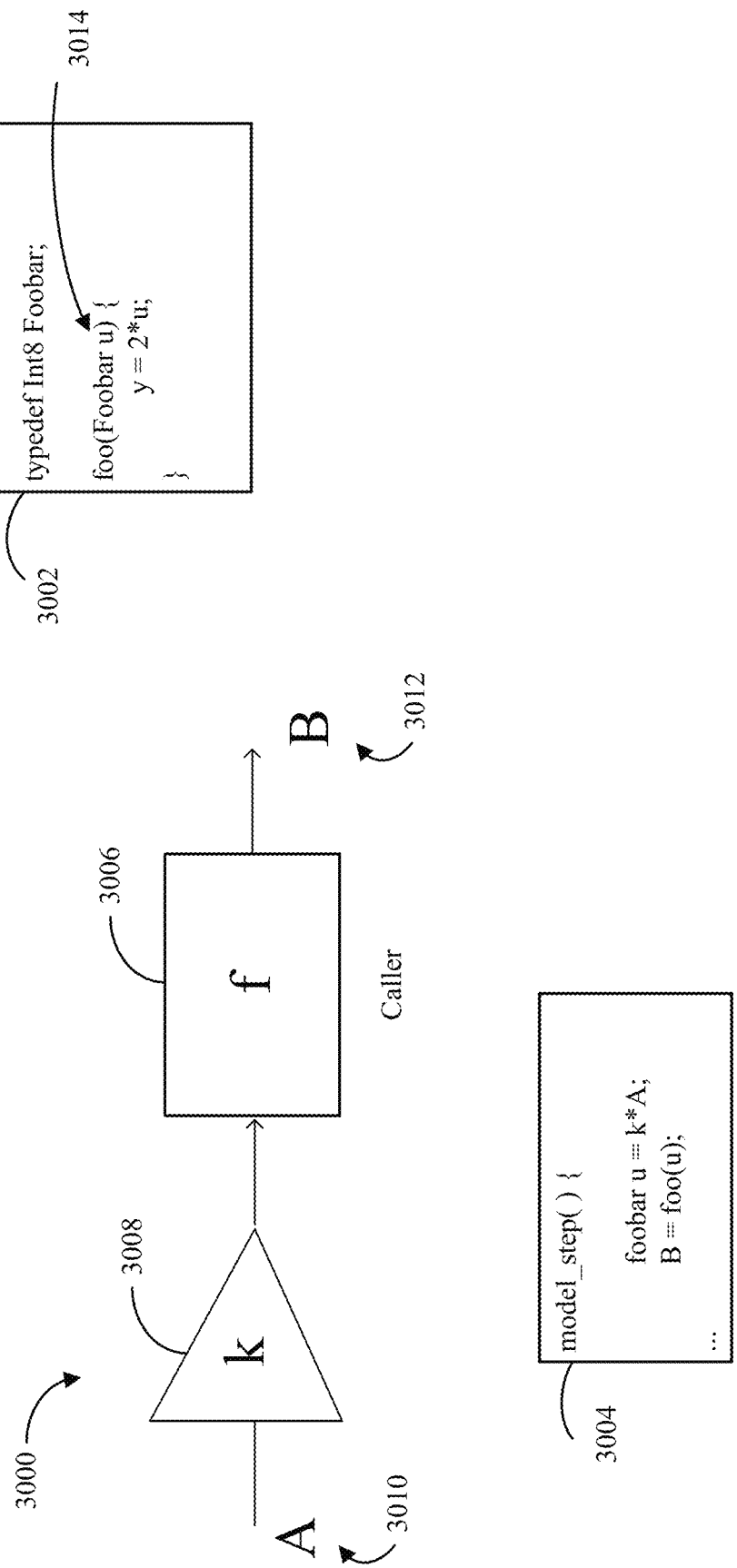
FIG. 27 is an illustration of an example of a graphical model that includes integrated external code, and code generated for the graphical model.

An example of code 3004 generated for a model 3000 that integrates external code 3002 is shown in FIG. 27. In this example, using the integration mapping information and augmentation information, the code generator identifies the c-caller block 3006 is a native representation, e.g., an interface with wrapper code, of the external code 3002 integrated in the model 300, while other model elements 3008, 3010, 3012 are native model elements. The code generator further determines that the input port to the c-caller block 3006 can be mapped to an input 3014 of external function foo in external code 3002. Together with the type definition within the external code and the native blocks 3010 and 3008, the code generator generates code line: foobar u=k*A that uses the type definition that is native to the external code 3002. Additionally, the code generator generates a function call B=foo(u) based on the integrated code 3002 and based on the native model element 3012. Without using the mapping and augmentation information, or without the code generator improvement/adaptation, the code generator cannot generate code 3004 that uses type definition and function name that are native to the external code. Instead, wrapper code will need to be generated to call the external code 3002. As an alternative to the code 3004, the code generator can also inline the foo function from the external code 3002, which is not shown in the figure.

As described above, function argument mapping may be at runtime or code generation. For example, user augmented function argument mapping information can be used during runtime and code generation to create a proper interface from a native user interface diagram, such as to call a particular C/C++ or other function. For an argument mapped to "input," "output," or "parameter," a corresponding native buffer value may be passed to such function in the case where the argument is pass-by-value, or a corresponding native buffer address may be passed to such function in the case where the argument is pass-by-pointer. In the case where mapping is to both "input" and "output," one input port and one output port of the same name may be created for the argument. The computing environment 100 may attempt to reuse the same buffer for both of the input and output ports. However, if the computing environment 100 is unable to do so, a full assignment from the input port buffer to the output port buffer is executed at runtime and at code generation. For an argument mapped to "constant," the computing environment 100 may evaluate the user entered value expression and pass the resolved value directly to a C/C++ or other function at runtime, unlike at code generation in which the resolved value is hard coded in the generated function call statement. For pass-by-pointer or array arguments which are mapped to an "output" port, a full assignment to the output buffer array may be assumed, such as to enable certain code generation optimizations in a surrounding context.

FIGS. 5A-F are illustrations of example code, user interfaces, and models relating to the mapping of elements of a semantic entity to elements of an executable model using types and structures. In many cases, variable types (semantic entities of the external code) may have a one-to-one mapping to element types (internal semantic entities of the internal code) of the computing environment 100. For example, where the computing environment 100 is the Simulink® model-based simulation and design environment, "double" maps to "Simulink double," "float" maps to "Simulink single," "struct" maps to "Simulink.bus," and "enum" maps to "Simulink.IntEnumType". Integer types have an inherent under-specification as they can be specified as fixed point types. Thus, a user may be prompted to input values for under-specified attributes such as "<Word_Length>" and "<Fraction_Length>" to specify a fixed point type. At runtime, integer signal values are re-interpreted according to the fixed point specification. Further, an integer to fixed point type mapping may apply to the mapping of "struct" variable type fields. For example, if a struct has integer type fields, such fields may be mapped to, for example, "Simulink.Bus" elements of fixed point types.

FIGS. 5A-C relate to examples of an integer type specified as a fixed point type. In FIG. 5A, external code 500, shown as a C function, is implemented in fixed point arithmetic. As shown, the external code 500 includes an integer type variable int16_T sfix16_En3 502, which is a 16 bit integer input that is treated as "fixdt(1, 16, 3)" (a fixed point data type with a sign bit, 16 bit word length, and 3 bit fraction length). To call the function from the external code 500 in the computing environment 100, a window 504, as shown in FIG. 5B, is presented to a user. The user is prompted for information characterizing the function interface type, such as to augment it from default "int16" to "fixdt(1, 16, 3)". In particular, the window 504 includes a row entry for an argument 506 in which the type is an under-specified attribute. Options 508 are presented through the window 504 to allow the user to select the type for the argument 506. The options 508 are options of entries of default type and suggested types, including an integer type int16, a fixed point type fixdt(1, 16, 0), and a fixed point type fixdt(1, 16, 2^0, 0). The user may select one of the options 508 to resolve the under-specification associated with the argument 506 or edit and then select one of the options 508 to resolve it. FIG. 5C shows a graphical representation 510 of the function from the external code 500. The graphical representation 510 may, for example, be a model executable within the computing environment 100. The graphical representation 510 includes a graphical block 512 representing the function of the external code 500, graphical blocks 514 and 516 representing input arguments (u, K) of the graphical block 512, and a graphical block 518 representing an output argument (out) of the graphical block 512. The type of the output argument as shown in the graphical block 518 is a fixed point type rather than an integer type.

FIGS. 5D-F relate to examples of an integrated C struct as a mapped element (e.g., Simulink.Bus) with a field type that has been augmented as a fixed point type. In FIG. 5D, external code 520 is shown as including a function counterbusFcn 522. The function 522 takes input arguments from C struct types 524, 526, 528. FIG. 5E shows a model 530 including graphical blocks 532, 534, 536, 538, 540. The graphical blocks 532, 534, and 536 represent input arguments of the C struct types 524 and 526 (e.g., int input, int upper_saturation limit, and int lower_saturation limit) from the external code 520. Those input arguments are integrated as Simulink.Bus objects in the function 522, represented by the graphical block 538. The C struct types 524, 526, and 528 may also be represented as "Bus" signal lines in a user interface diagram of the computing environment 100, such as shown within the graphical block 540. For example, as shown in the graphical block 540, the C struct type 524 maps the input argument represented by the graphical block 532 to the structure "SIGNALBUS" 542, the C struct type 526 maps the input arguments represented by the graphical blocks 534 and 536 to the structure "LIMITBUS" 544, and the C struct type 528 maps the structures "SIGNALBUS" and "LIMITBUS" to the structure "COUNTERBUS" 546. FIG. 5F shows a window 548 which includes fields describing the attributes of an example of a Bus element to which one of the C struct types 524, 526, and 528 is mapped. The type 550 of the Bus element is an under-specified attribute. For example, the C struct type "SIGNALBUS" field "input" can be augmented from the base "int" type to "fixdt(1, 32, 6)" to resolve the under-specification.

Figures 6A, 6B:
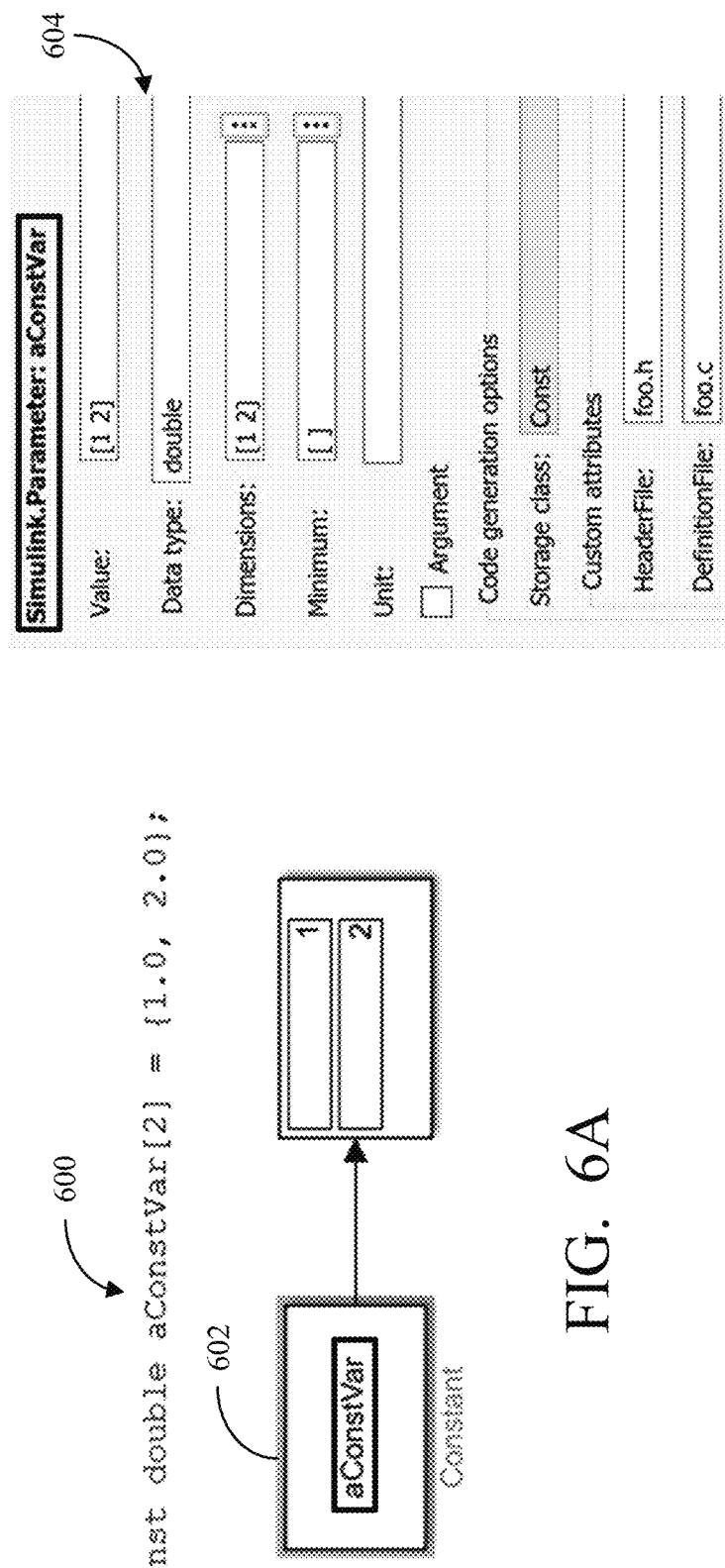

FIGS. 6A-B are illustrations of example code, user interfaces, and models relating to the mapping of elements of a semantic entity to elements of an executable model using constants. External code 600 is a C code constant variable. An internal semantic entity 602 within the computing environment 100, shown as the parameter "aConstVar", is used to specify a constant block value for the external code 600. For example, where the computing environment 100 is the Simulink® model-based simulation and design environment, the C code constant variable may be integrated as a "Simulink.Parameter" of the "Const" storage class. A window 604 shows the attributes of the internal semantic entity 602. Attributes of the internal semantic entity 602 as shown in the window 604 (e.g., Value, Data type, Dimensions, Minimum, Unit) may be determined by parsing the external code 600 using an integration module. An under-specification may occur where the external code 600 is determined to use an integer type augmented as a fixed-point type in the computing environment 100 (e.g., such that the integer type is used as a base, similar to floating-point, but where the point is fixed, thereby achieving a wider range but stored in a certain size). For example, if the variable is "int," the external code 600 is integrated as "fixdt(1, 16, 3)" signed 16 bits precision of 3 bits on the right, and the type is "int16 t" in C such that a user is prompted for the under-specified attribute of the precision bits. The mapping thereof may be similar to the mapping of types as described with respect to FIGS. 5A-F.

Figure 7A:
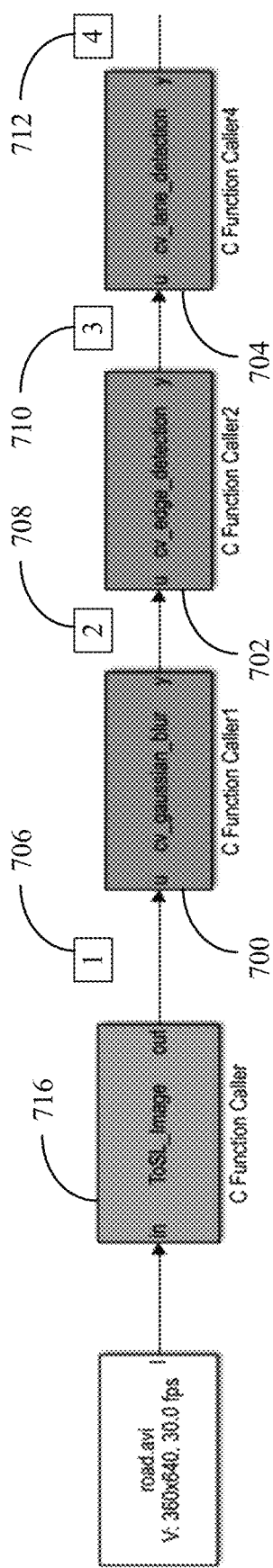
Figure 7B:
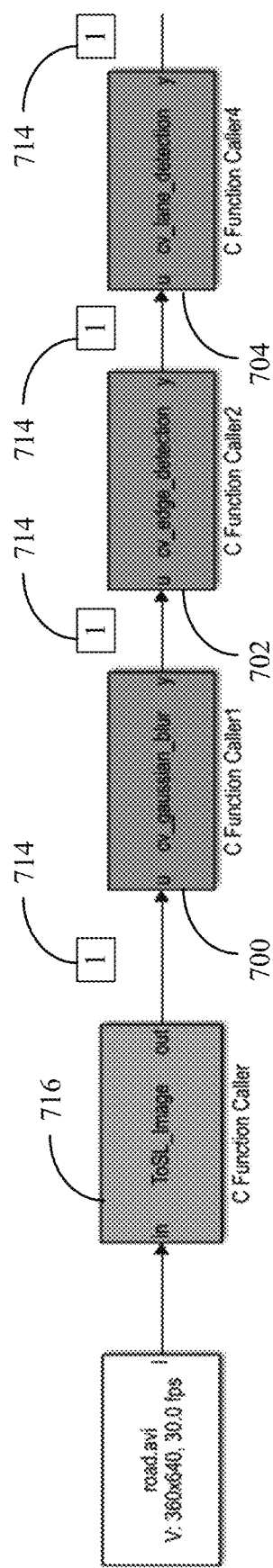

FIGS. 7A-B are illustrations of example code, user interfaces, and models relating to the mapping of elements of a semantic entity to elements of an executable model using references. By default, the signals passing through a user interface diagram of the computing environment 100 may be of value semantics. This example corresponds to a function OpenCV image (cv::Mat) passing through image processing blocks labeled C Function Caller1 700, C Function Caller2 702, and C Function Caller 4 704. Semantically, each line segment is an independent OpenCV image by its value. Each of those image processing blocks 700, 702, 704 processes its input image and writes to a different image as the output thereof, even where the underlying functions may process images by reference or in-place. In FIG. 7A, four image buffers 706, 708, 710, 712 are provided in value semantics, such that a user may be prompted to select references instead. In FIG. 7B, only one image buffer 714 is passed through the image processing blocks 700, 702, 704 by its reference, such that a user may be prompted to indicate whether the functions support in-place operation. Thus, a function 716 can include an under-specified attribute for indicating whether in-place operation using the one image buffer 714 is to be used.

Figure 8A:
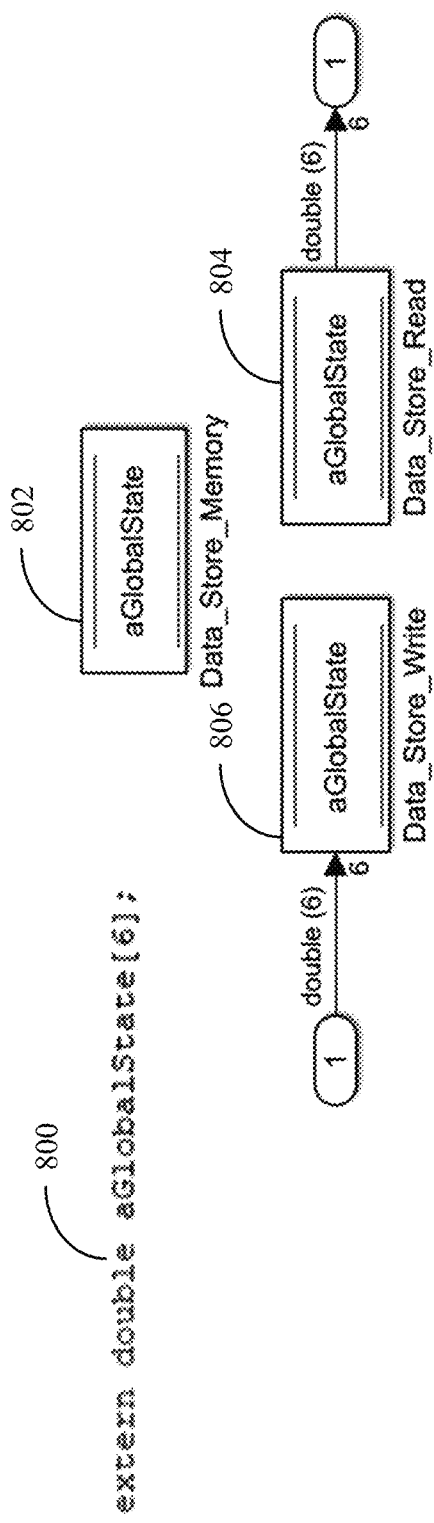

FIGS. 8A-E are illustrations of example code, user interfaces, and models relating to the mapping of elements of a semantic entity to elements of an executable model using states. FIG. 8A relates to examples in which global variables from external code are used as states. A global variable 800 (e.g., shown as "extern double aGlobalState[6]" in C code) may be a global state in external code. The state of the global variable 800 may, for example, be integrated as a data memory store block 802 and accessed via a data store read block 804 and a data store write block 806 associated with a function that uses the global variable 800. Type and size attributes may be determined for the global variable 800 by an integration module parsing the external code that includes the global variable 800. An under-specification may result in the case where the integer type of the global variable 800 is augmented as a fixed-point type in the computing environment 100. For example, the integrated data store memory, corresponding to the data memory store block 802, may have the ImportedExtern storage class. At runtime, the computing environment 100 may use get( ) and/or set( ) functions for the read and/or write accesses (respectively corresponding to the data store read block 804 and the data store write block 806) for the global variable 800. The computing environment 100 may also use an initialize( ) function to properly initialize the state of the global variable 800 at the beginning of a simulation or otherwise use the initialize( ) function in a model initialization of the generated code.

Figure 8B:
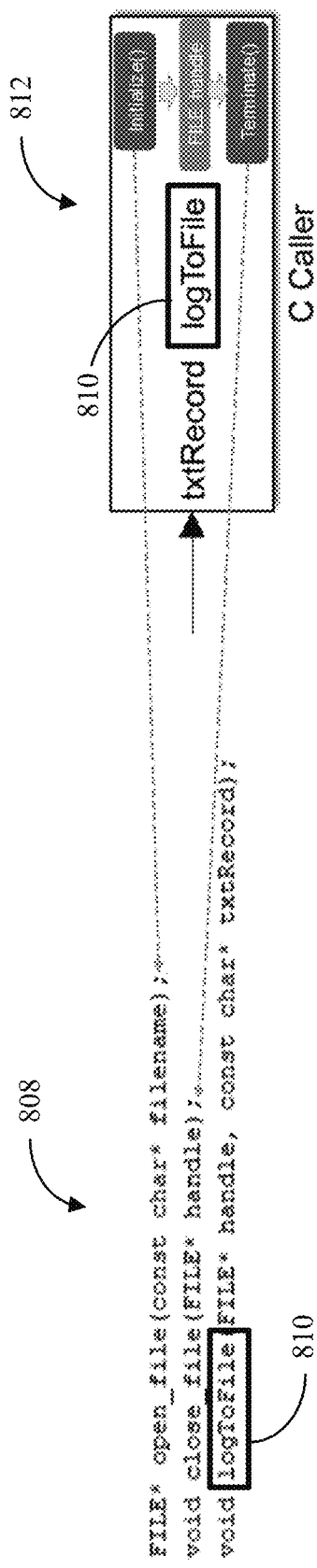

FIG. 8B relates to examples in which a block instance state is allocated from external code 808. For example, a function void logToFile 810 of the external code 808 may operate on an object that is created and/or instantiated by the external code 808. Integrating the function 810 within internal code of the computing environment 100 may, for example, include generating a graphical block 812 representing the function 810. The graphical block 812 may be used to construct, cache, and delete an object instance. The object construction and deconstruction functions are associated with the graphical block 812. As shown, the function 810 is integrated from the external code 808 into internal code of the computing environment 100. The graphical block 812 calls "open_file( )" during initialization and caches the opened file handle. For block step behavior, the "logToFile" block calls "logToFile( )," passing the cached file handle and a text record received from the input port. Block termination will close the cached file handle. The user identifies a set of "construction," "deconstruction," and "operation" external functions to the block as the under-specified attributes of the function 810, such as via a user interface or an application programming interface (API). The function signature is checked for a match to a certain pattern. The "filename" argument of the "open_file( )" function maps to the block parameter. The computing environment 100 may allocate an object instance state buffer for the block and call the set of functions in semantic order for runtime and code generation. For example, a block may implement one or more pre-defined block interface methods, e.g. start, initialize, update, step(must implement), terminate, etc. In this example, "initialize( )", "step( )", "terminate( )" block interface methods can be implemented when three corresponding C functions are identified, e.g., automatically or through a user selection. The C functions can be called, e.g., during simulation or in code generated, according to a block interface. For example, the calling sequence can be: initialize( )>step( )>step( )> . . . >step( )> terminate( ).

Figures 8C, 8D, 8E:
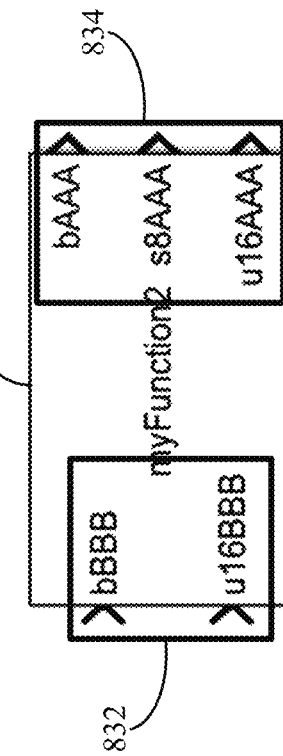

FIGS. 8C-E relate to examples in which global variables from external code function as input and/or output and thus not strictly as a state. Functions declared without input/output (e.g., void(void)) are an external code pattern. However, such functions may have input and output conceptually through the reading and writing of global variables. The computing environment 100 may use such conceptual input and/or output visually as input and/or output ports (as applicable) once those functions are integrated. The computing environment 100 may use a parser and code analysis to gather access information for the global variables. The user may indicate (e.g., via a user interface or an API) that a global variable is to have controlled read/write access. In such a case, the global variable may disappear from the block input/output. The computing environment 100 may monitor and limit global input/output usage so as to prevent misuse thereof. For example, multi-writes to a same global variable may not be allowed in an executable model. The computing environment 100 may include an interface configured for accessing such global variables for runtime use and/or for code generation.

For example, in FIG. 8C, external code 814 includes a first set of global variables 816 and a second set of global variables 818. In FIG. 8D, external code 820 for a function void myFunction2 includes functions 822, 824, for writing and reading values of the global variables within the sets 816 and 818 of global variables. The functions include a defined setter 826 and defined a getter 828. In FIG. 8E, a graphical block 830 representing the function of the external code 820 has input arguments 832 that correspond to the second set of global variables 818 and are based on the read operations from the functions 824 and 828. The graphical block 830 also has output arguments 834 which correspond to the first set of global variables 816 and are based on the write operations from the functions 822, 824, and 826.

Figure 9A:
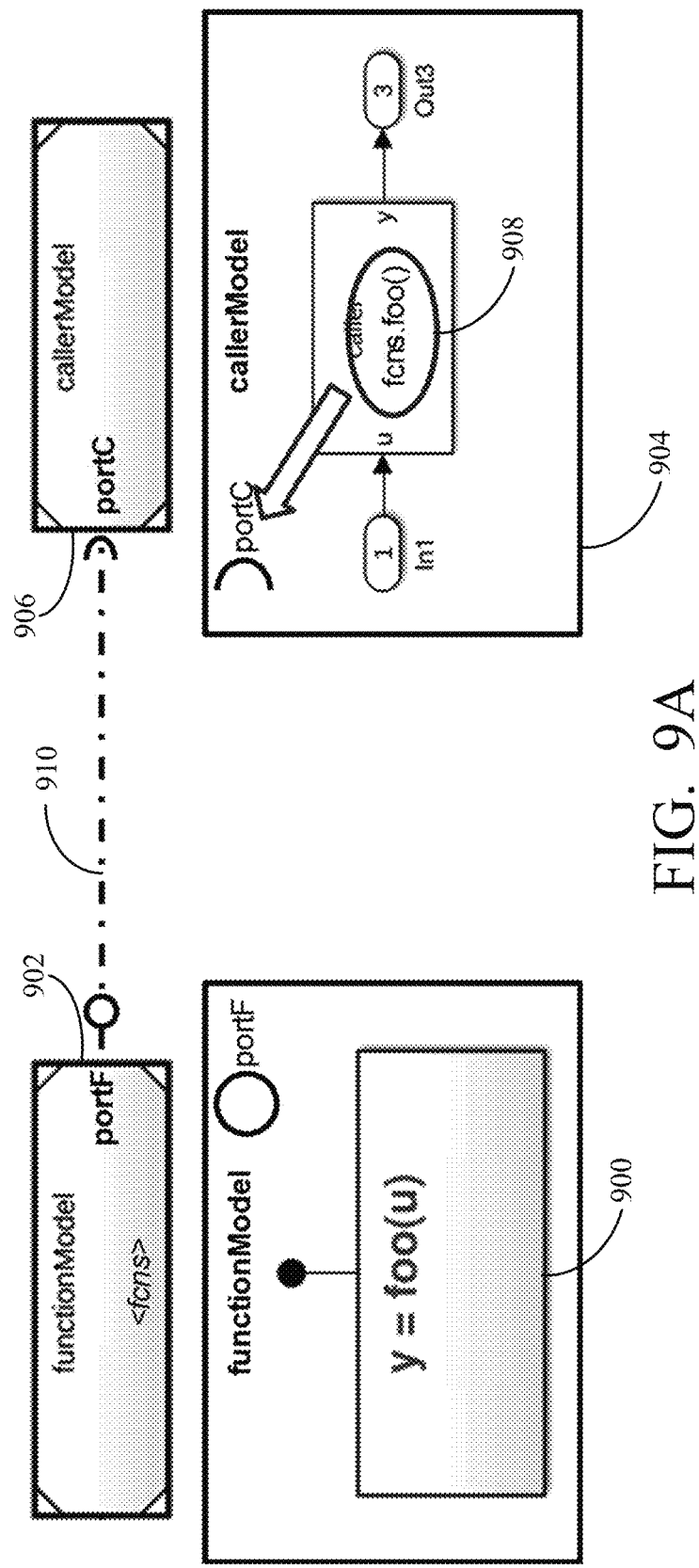
Figure 9B:
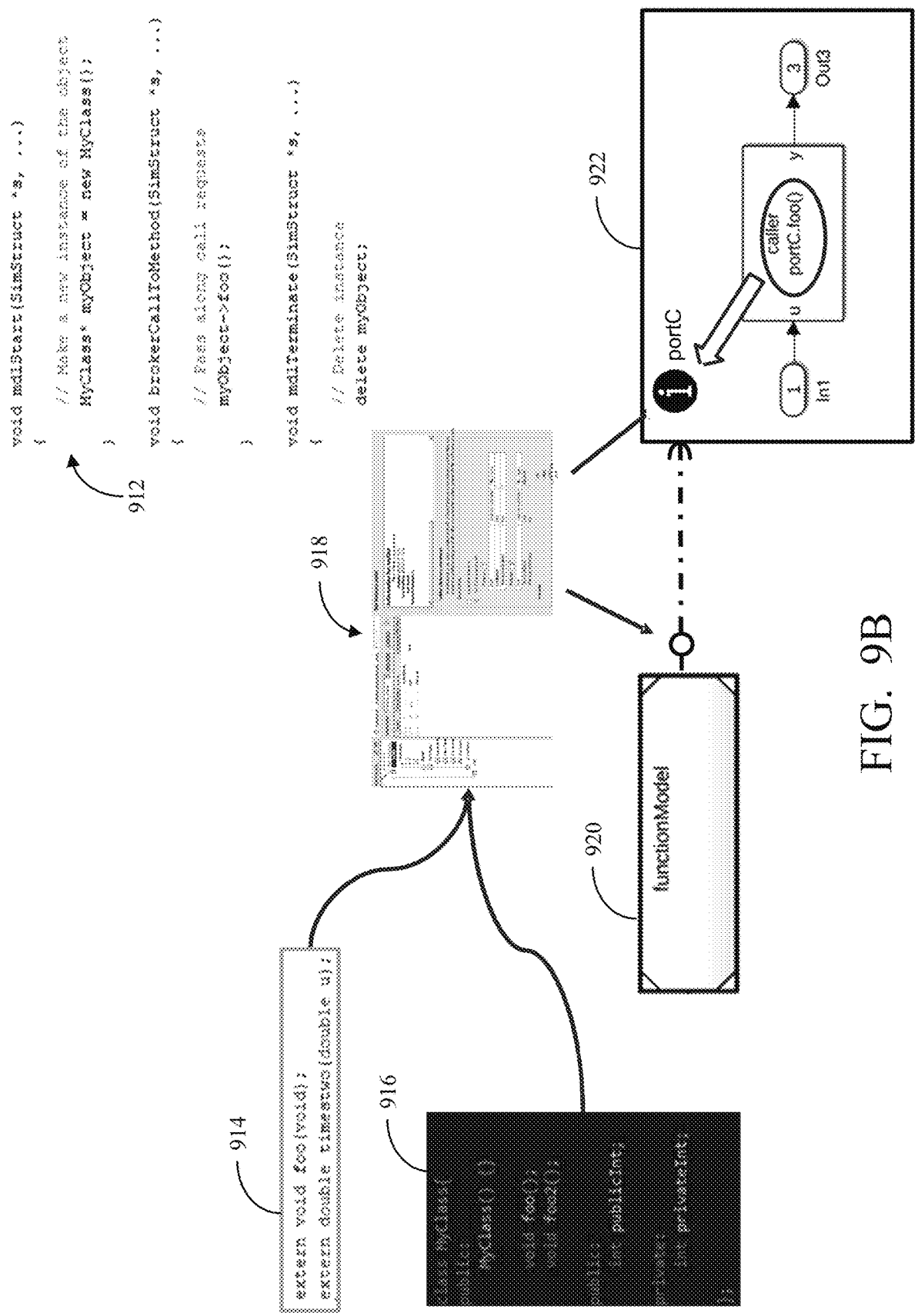

FIGS. 9A-B are illustrations of example code, user interfaces, and models relating to the mapping of elements of a semantic entity to elements of an executable model using service ports. The service ports represent an abstraction of the C/C++ or other code. More particularly, the service ports may represent instances of objects from the C/C++ or other code. The service ports are provided by an executable model, by external C functions, C++ classes, or the like. A unified dictionary can be used to provide an interface of types to a user interface diagram. Referring first to FIG. 9A, the use of a service port first includes defining the services provided, which may, for example, relate to a function 900. For example, the function 900 may be a function included in internal code of the computing environment 100. Next, a new service port 902 is introduced at an interface of the function 900. The new service port 902 may, for example, be a new port of a graphical block representing the provided service. The services required are then defined, such as based on a function 904 identified within external code. For example, an integration module can parse external code to identify the function 904 as a required service. Next, a new service port 906 is introduced at an interface of the function 904. The new service port 906 may, for example, be a new port of a graphical block representing the required service. The interface ports 902 and 906 may be strongly typed. A provider and a consumer should both agree on the interface for the connection to be valid. Next, elements 908 of the function 904 are determined. The elements 908 can be used to determine mappings to elements of the function 900. The provider and the consumer are then connected using a connection 910 between the interface ports 902 and 906. Referring next to FIG. 9B, the use of service ports as abstractions to an object of external code 912 is described. A service 914 provided by functions of the external code 912 and services 916 provided by a class of the external code 912 are referenced by a unified dictionary 918 that provides interface types for the service 914 and for the services 916. The unified dictionary 918 can be used to provide a first graphical block 920 for a function related to the service 914 or to the services 916. A service port representing an instance of the class object can also be used to request the service 914 or the services 916, such as during the function call of a second graphical block 922.

Figure 11:
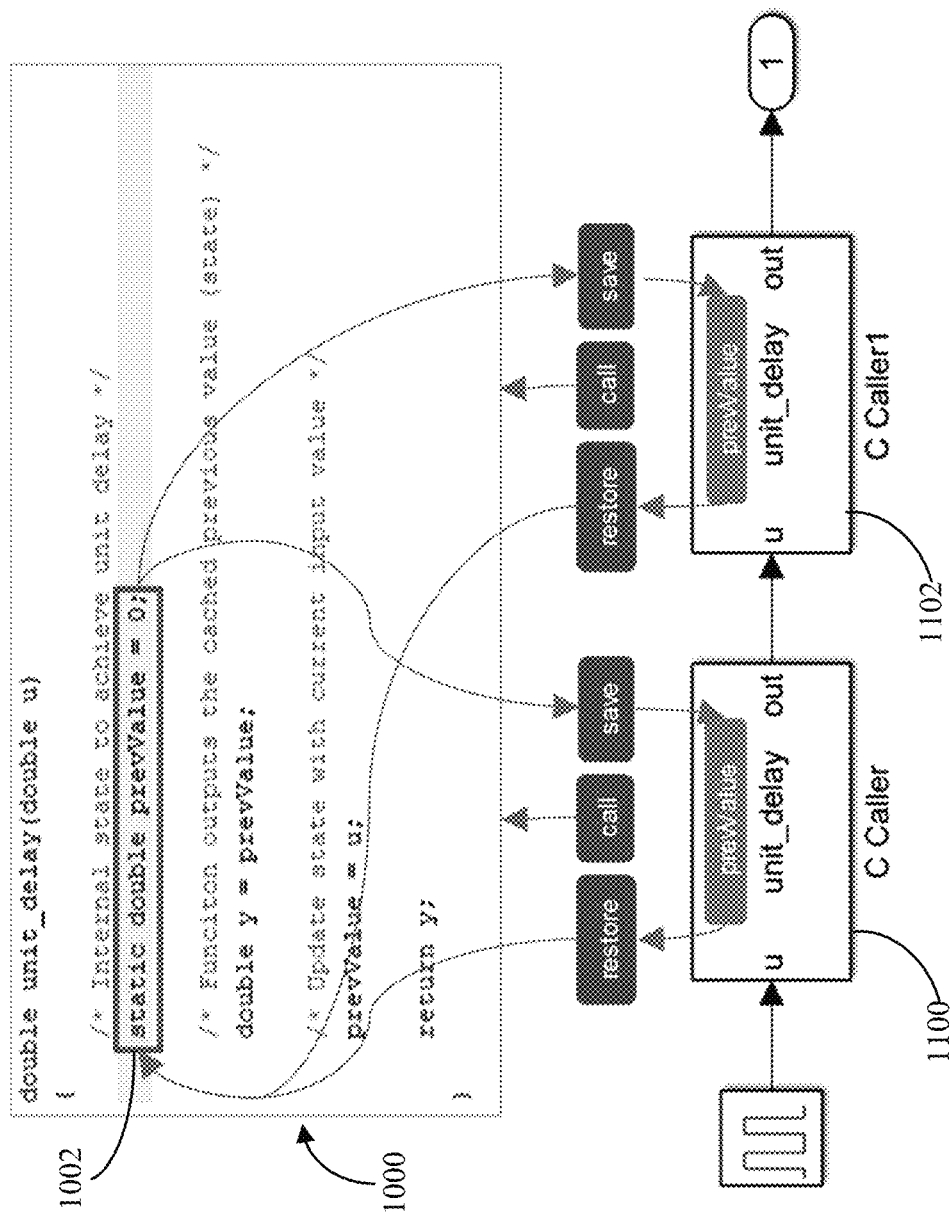

FIGS. 10A-B and 11 are illustrations of example code, user interfaces, and models relating to the mapping of elements of a semantic entity to elements of an executable model using sandboxing. In FIG. 10A, a function double unit_delay( ) 1000 is shown. The function has a state that can usually only be single instantiated. For example, the function 1000 can have the state "prevValue" 1002. A multi-instantiation of the function call for the function 1000 does not work as there is only one copy of the state 1002. For example, in FIG. 10B, graphical blocks of a model for the function 1000 work as expected in a single instantiation 1004; however, a multi-instantiation 1006 of the function 1000 does not work as expected since the state 1002 is not intended to be shared between instantiations of the function 1000. In FIG. 11, the state 1002 is sandboxed to enable multi-instantiation. In the example shown, each of the two graphical blocks 1100 and 1102 representing different instantiations of the function 1000 maintain their own copy of the state 1002 (i.e., of the value of the variable prevValue). At each invocation, the graphical block 1100 or 1102 first writes its copy of the value of the state 1002 to an external state, so as to restore an external value of the state 1002. The graphical block 1100 or 1102 then calls the function 1000. After the function call, the graphical block 1100 or 1102 reads the external value of the state 1002 and saves the read value to a copy specific to that graphical block 1100 or 1102.

Figure 12:
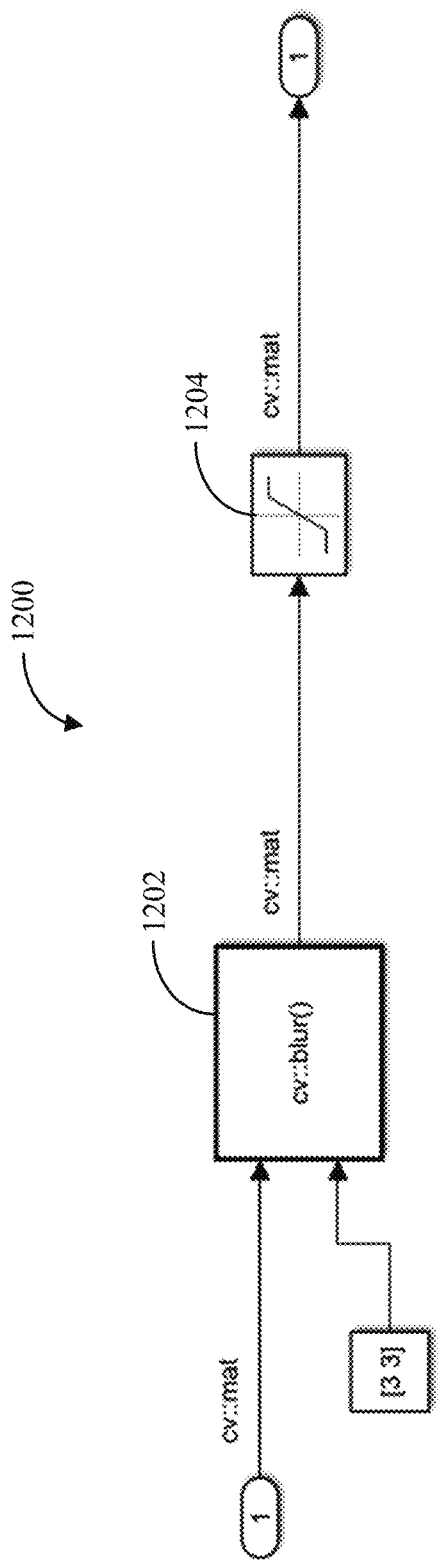
Figure 13:
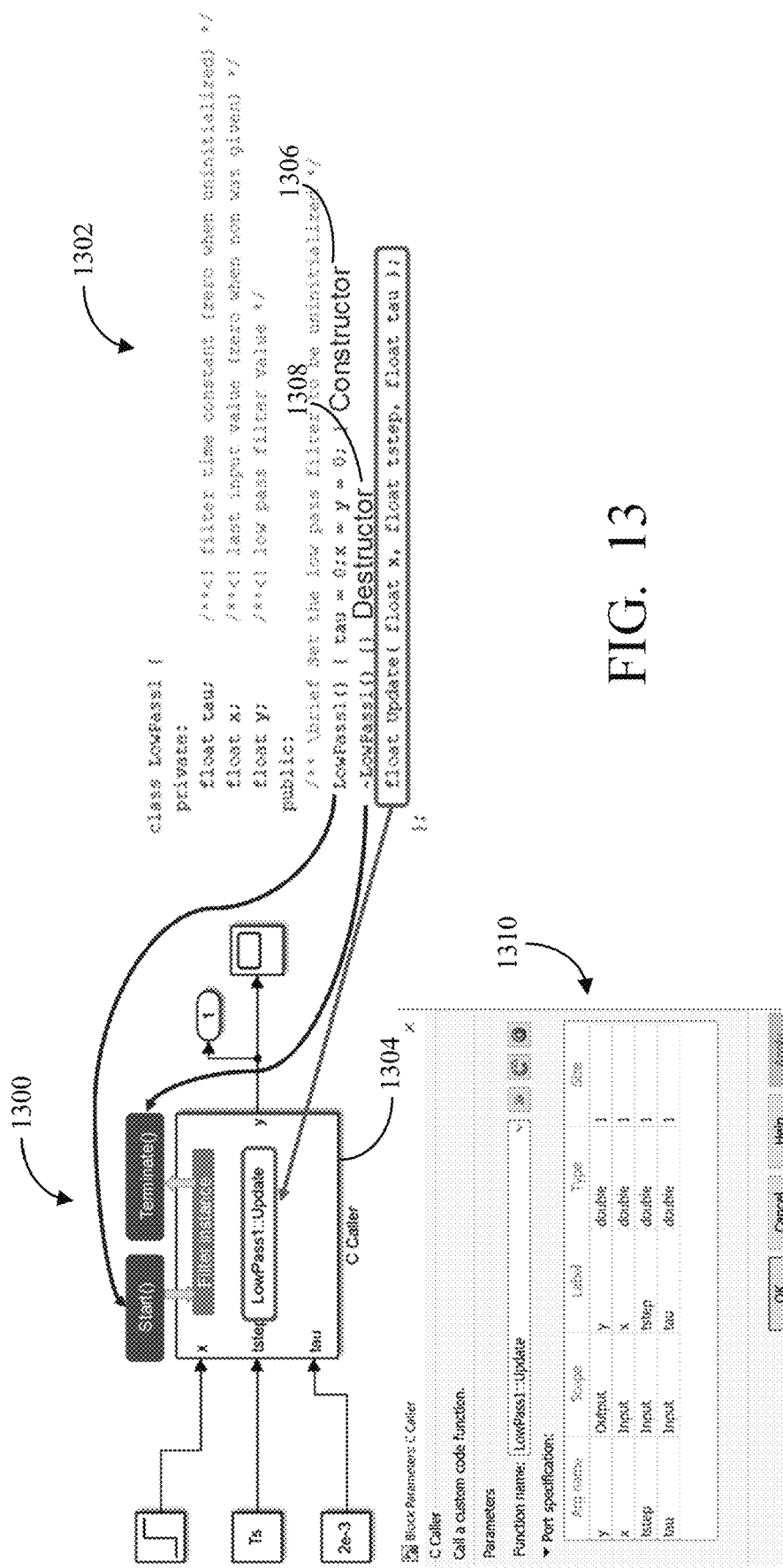

FIGS. 12 and 13 are illustrations of example code, user interfaces, and models relating to the mapping of elements of a semantic entity to elements of an executable model using object oriented constructs. First, in FIG. 12, a model 1200 is a model for processing image data of object type cv::mat within the computing environment 100. The image data is propagated through algorithmic blocks 1202 and 1204 by value or reference. An instance of the class object cv::mat from external code is represented as signal values and flow on signal lines between the blocks 1202 and 1204. For example, the class object cv::mat can be represented as a recognized numeric type within the computing environment 100. Additional metadata description of cv::mat can be supported so that the object type is semi-transparent to the computing environment 100. The metadata may, for example, be image size data, matrix value data, color coding scheme, or the like. Next, in FIG. 13, a model 1300 is a model for a class of low pass filter of external code 1302 with the single service "update" to bring in. The block 1304 instantiates a low pass filter instance of the class object when the simulation starts (using a Start( ) function) by calling a constructor function 1306 of the class. The block 1304 then deletes the filter instance when the simulation terminates (using a Terminate( ) function) by calling a destructor function 1308 of the class. During the simulation, the block 1304 invokes the update service of the low pass filter class object at each time step. Accordingly, the model 1300 represents a use of the class object as an algorithm or service with encapsulated data. Information about attributes from the functions of the external code 1302 is displayed in a window 1310, for example, for a user to resolve an under-specification related to the class object (e.g., under-specified Scope).

Examples of code, user interfaces, and/or models relating to the mapping of elements of a semantic entity to elements of an executable model using techniques other than those described with respect to FIGS. 3-13 may be provided. For example, a computing environment may include functionality for mapping using rates. For example, a C function by itself may not have the concept of "rate" or "sample time," that is, at which frequency a semantic entity such as a function should be called. The omission of a rate entity within the C code (the external code) is in an under-specification, with the rate value (e.g., the sample time) being the under-specified attribute. When the C code is integrated into the computing environment 100, a user may specify a sample time for the semantic entity. If under-specified, a side effect free function which is compatible with all sample time may be used. The side effect free function may be called any number of times. For example, if a rate is not received from the user, the user may be prompted for side effects. If the user confirms none, the side effect free function may be used in a flexible way and without a rate (e.g., via conditional run at the time of compiling). As used herein, a function is side effect free in which it is stateless such that, given an input value, the function generates the same output regardless of the number of times it has been called. Examples of a side effect free function include, but are not limited to, print to console functions, write to file functions, discrete sample time functions, multi-rate functions, constant sample time functions, continuous sample time functions, and the like. A non-side effect free function is not compatible with a constant sample time or with a continuous sample time.

FIG. 14 is an illustration of a table 1400 of example mappings between external code elements and internal code elements. The example external code elements shown in the table 1400 are from the C and C++ languages; however, other examples and types of external code elements may be integrated within a computing environment. After parsing external code, and for each semantic entity identified, a function may be called within a computing environment to integrate that semantic entity. Each of the semantic entity elements shown can be categorized into one of four broad categories of element type, including package/class, function/method, variable, and type/exception keywords. For the package/class type, elements that contain other elements and/or classes which have some functionality other than as a package may be integrated. For the function/method type, the function or method may be integrated without consideration of the contents thereof. For the variable type, elements that appear outside of functions/methods or within an input/output interface may be integrated. For the type/exception keywords type, special types (e.g., struct), special keywords (e.g., those indicating behaviors, such as behaviors associated with exceptions or other special functionality) and other standard and/or custom exceptions may be integrated. The 'First Native Environment' and the 'Second Native Environment' columns show examples of different internal code to which the external code may be mapped in different native environments.

4 Technical Computing Environment

Figure 15:
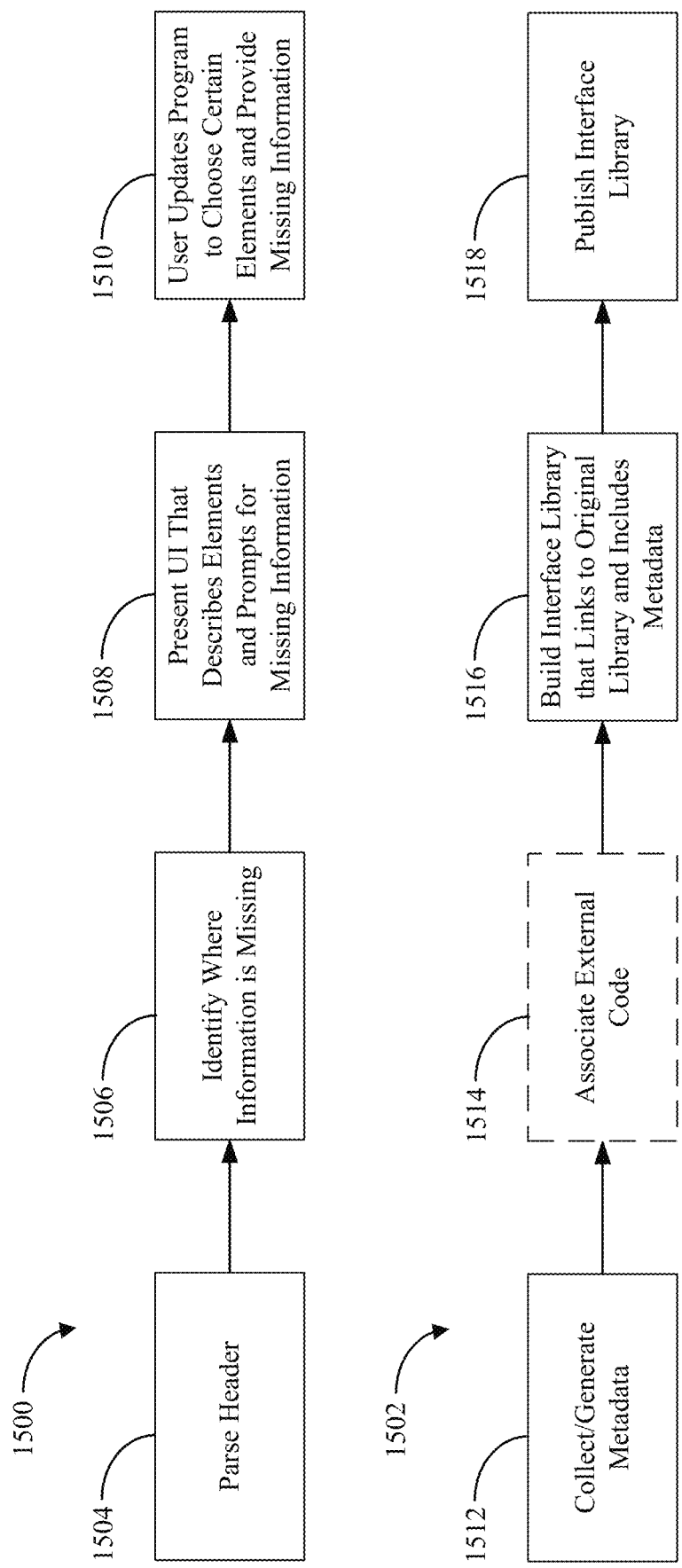
FIG. 15 is an illustration of examples of workflows for integrating external code within a computing environment.

In some implementations, the environment 100 of FIG. 1 can be a technical computing environment, examples of which includes MATLAB, Mathematica, Python, Julia, Octave, Scilab, Sage. FIG. 15 is an illustration of examples of workflows 1500 and 1502 for integrating external code within such a computing environment. The workflows 1500 and 1502 represent operations performed for external code integration, for example, using the integration module 112 and by performing the process 200. The workflows 1500 and 1502 can be used for generating interface elements for integrating external code within a computing environment and making those interface elements available for use to perform tasks within the computing environment.

The workflow 1500 processes the external code for integration. At 1504, a header within external code is parsed. For example, the header may be a .h file of a C++ program written in an environment that supports C++ development. In another example, the header may be a file or document which includes external code written in a language that is not native to the computing environment within which the external code will be integrated. Parsing the header can reveal an under-specification in the form of missing information. Additionally, at 1506, analysis can be performed to identify where such information may be missing (e.g., under-specified attributes of an internal semantic entity) based on the parsed header or other portions of parsed external code. The missing information may reflect an under-specification resulting from a mapping of the external code to elements of the computing environment. The missing information can be identified by comparing known elements from the external code to known elements of a model of the computing environment and determining the elements of the external code which do not have known corresponding elements within the model of the computing environment. In particular, the missing information may refer to one or more elements of the external code which are not specified to the computing environment and which require specification in order for the external code to be used to perform a given task. Examples of missing information can include missing shape (e.g., dimensionality and/or size) of a data value or a missing direction of a function argument in the example of C++ headers/header files for functions integrated into MATLAB, and missing rate or scaling information in the example of C++ headers/header files for functions integrated into Simulink. At 1508, a user interface is presented that describes the elements of the external code and prompts the user for the identified missing information. For example, the user interface presented can include a window (e.g., the window 308) which shows the elements of a semantic entity identified by parsing and mapping the external code, along with a list of options which may be selected by the user to provide the missing information. At 1510, the user updates the internal code which has mapped to the external code (e.g., the internal semantic entity) to indicate the missing information. The information provided by the user is stored as augmentation information in connection with the internal semantic entity, such as for later use in executing the internal code which now integrates the external code.

The workflow 1502 generates and publishes an interface library for the external code integrated with the internal code of the computing environment using, e.g., the workflow 1500. At 1512, metadata is collected and/or generated. For example, metadata previously generated by the workflow 1500 may include a set of mappings from external semantic entities to internal semantic entities. The metadata may have come into existence at any of a variety of steps in the workflow 1500, including at the end of 1504 or 1506, optionally updated at 1510 by the user through internal code/graphical elements. At 1514, optionally, external code that may be executed at runtime, along with any generated internal code, may be generated or otherwise received, for example, from an environment external to the computing environment 100 (e.g., the external environment 108). At 1516, the interface library is built to link to an original library used by the internal code of the computing environment 100, and which interface library includes the metadata created by the integration module 112. The interface library may, for example, be a DLL which includes the internal code of the computing environment 100 to which the external code is mapped along with augmentation information produced to resolve under-specifications within the external code. Building the DLL may optionally include updating a variety of data structures and/or files for internal code based on the metadata. At 1518, the interface library is published for use within the computing environment 100. The interface library may be selected for use within the computing environment 100 by including a call to the interface library, or a semantic entity within the interface library, within internal code, for example. Alternatively, the interface library may be selected for use within the computing environment 100 by including a graphical block representing the interface library within a graphical model of the computing environment.

The workflows 1500 and 1502 can enable easy integration and usage of external code, e.g., code from a non-technical computing environment or a different technical computing environment within the computing environment 100. For example, rather than requiring a user to manually manage memory and pointer usage when integrating external code, the workflows 1500 and 1502 offer options for automated user-guided integration. In this way, the user does not need to work with arrays of unknown sizes from the external code, thereby reducing the amount of memory that will be used to provide the missing information for the integration. Furthermore, the computing environment 100 becomes better suited to handle exceptions and compiler incompatibilities arising from the use of the external language of the external code within the computing environment 100.

In another example, the user-provided information used to resolve an under-specification can produce an interface library which is effective for executing the external code based on a best guess as to how to resolve any under-specification. The interface library can provide improved mapping of language attributes, improved lifecycle management practices, and renaming practices. In yet another example, an interface library can include all of the entry points that the internal semantic entity integrated with the external code uses for execution, along with the metadata used to understand how those entry points are used and exposed within the computing environment.

FIGS. 16-23 are illustrations of examples of external code parsed and mapped to internal code of the computing environment 100. Referring first to FIG. 16, an MLX definition is shown. The definition is an example of internal code that may be generated after external code is parsed to identify semantic entities and any under-specified attributes of the semantic entities. In this example, one of the identified semantic entities is a function "foo" and another semantic entity is an input argument "input1" of that function. The function "foo" is an external semantic entity that will be mapped to a corresponding function as an internal semantic entity. The input argument "input1" is an external semantic entity that will be mapped to a corresponding argument as an internal semantic entity. But, the arguments of functions in the native language are capable of being specified as having a "direction," where a direction is an attribute of an argument that specifies whether that argument is an "input" argument, an "output" argument, or an "inputoutput" argument meaning that the argument acts as both an input and an output argument. For example, the value of an inputoutput argument may be used as input to a function and also returned as an output along with any output arguments or other inputoutput arguments. In the external language (C++ in this example), an argument does not have a direction attribute, so that argument is therefore under-specified.

Calls to internal functions addFunction( ) and defineArgument( ) can be generated, for example, after parsing the external code. The internal function addFunction( ) is used (e.g., by the integration module 112) to map the function foo (as an external semantic entity) to a corresponding function (as an internal semantic entity). The internal function defineArgument( ) is used (e.g., by the integration module 112) to specify an under-specified attribute, which in this example is the direction of the input argument "input1". The direction is defined as "inputoutput" in this example, which has no equivalent attribute in the external language. Available information may be presented to a user in a prompt for selecting or specifying the correct value (e.g., "inputoutput") for the under-specified direction attribute.

Referring next to FIG. 17, the MLX definition for an external code function that takes a pointer as an input argument, and a corresponding length as another input argument, is shown. The external code is parsed to identify semantic entities and under-specified attributes of the semantic entities, in particular, in which the direction and shape for a pointer to non-constant data is under-specified. A "shape" indicates a size of a data structure, appropriate to the number of dimensions of that data structure. So, for vector or an array (e.g., a 1 dimensional array), the shape may be defined by an integer. The internal function defineArgument( ) is used to specify the under-specified attributes, which are characterized by placeholder values "<DIRECTION>" and "<SHAPE>" in this example. Available, information may be presented to a user for selecting or specifying values of the "<DIRECTION>" and "<SHAPE>" attributes in one prompt, or in two different prompts, for example.

Referring next to FIG. 18, an example of the internal code generated after the MLX definition of FIG. 17 has received a selection or specification from a user is shown. Here, the user of the computing environment 100 has provided information in response to the prompt or prompts for the values of "<DIRECTION>" and "<SHAPE>". Thus, "inputoutput" is selected as the value of the element "<DIRECTION>" and "len" is selected as the value of the element "<SHAPE>" indicating that the length of the data structure will be found in the argument "len". The computing environment 100 can, for example, combine the argument "len" with the argument "input". For example, the function fooDefinition can map the external C++ code "void foo(int*input, int len)" to the internal program code "int32 clib.ptr.foo(int32)". For example, if the input array is "inarr=[1 2 3 4 5]", the function foo applied to that input "foo(inarr)" is able to be configured to automatically use a shape for that input that is computed using the length of the array, which is 5.

Referring next to FIG. 19, another example of internal code generated after the MLX definition of FIG. 17 has received a selection or specification from a user is shown. Similar to in FIG. 18, the user of the computing environment has provided information in response to the prompt or prompts for the values of "<DIRECTION>" and "<SHAPE>". Here, however, "output" is selected as the value of the element "<DIRECTION>" and "len" is selected as the value of the element "<SHAPE>". In this example, the function fooDefinition can map the external C++ code "void foo(int*input, int len)" to the internal program code "int32 clib.ptr.foo(len)".

Referring next to FIG. 20, external code from a LibXL library is shown. The external code is parsed to identify semantic entities and under-specified attributes of the semantic entities. The identified values "input" are arguments with under-specified attributes mapped to attributes of corresponding internal semantic entities. In the first case, argument "expr" can be int8, string, or char. Since there is not enough information specified in the external code to make a choice, this is an under-specified attribute of argument "expr". In the second case, the argument "format" is identified, where only <SHAPE> is under-specified. Available information may be presented to a user for selecting or specifying "input" in a prompt.

Referring next to FIG. 21, external code from an OpenCV library is shown. The external code is parsed to identify semantic entities and under-specified attributes of the semantic entities. For example, the internal function addClass( ) may be used after parsing the external code, and the element "clib.tpm.cv.Matx21f" of the addClass( ) internal function is determined to be an under-specified attribute thereof. Available information may be presented to a user for specifying or selecting "clib.tpm.cv.Matx21f" in a prompt.

Referring next to FIG. 22, external code including comments represented in a definition MLX is shown. The external code is parsed to identify semantic entities and under-specified attributes of the semantic entities. For example, the semantic entity HersheyFonts is identified by parsing the comments as documentation for the external language of the external code and converting those comments to documentation of the computing environment 100. An element of the documentation which is not mapped to any elements is the comment "II Comment unrelated to 'HersheyFonts'." Because the parsing and mapping functionality of the computing environment does not determine an association between that comment and the HersheyFonts semantic entity, the comment is not recognized as an under-specified attribute of the HersheyFonts semantic entity. The computing environment 100 may instead add C++ documentation for the comment to a definition of the HersheyFonts semantic entity.

Referring next to FIG. 23, native documentation for an end user is shown. The external code documentation is parsed to identify semantic entities and under-specified attributes of the semantic entities. For example, an enumeration is identified as a semantic entity by parsing the documentation, and an enumerant level comment element of the enumeration semantic entity is determined to be an under-specified attribute thereof. Information characterizing the enumerant level comment element may be presented to a user in a prompt. One of the options available for selection within the prompt may suggest that the enumerant level comment is associated with the enumeration semantic entity. In this way, the external code documentation is converted into native documentation of the computing environment 100, for example, to assist a user as to library semantics of the computing environment 100.

5 Exemplary External Documentation Processing

Information written into documentation accompanying external code (e.g., within an .arxml file or the like) can be parsed and mapped to help resolve under-specifications. For example, a developer of the external code may understand that the external code is written in a language that is not supported by the computing environment 100. To assist with mapping some or all of the external code, the developer or another user can indicate how those portions of the external code should be mapped into the computing environment 100.

That is, a computing environment that processes external code may process information captured from documentation associated with the external code. The captured information may then be added to definitions of semantic entities and available to users of the computing environment 100, for example, within a library available to the computing environment 100. Alternatively, or additionally, the captured information may be added to definitions of semantic entities within other documentation available to the user, such as to assist the user with his or her use and operation of the computing environment 100. The documentation processing can thus be provided to capture documentation which is intended to not be used in the computing environment 100 or in an environment of a language of external code related to the documentation and present the captured documentation for use in connection with the computing environment 100.

For example, the external code may include entities which map to an internal semantic entity of a rate type within the computing environment 100. Documentation related to the external code (e.g., included in an .arxml file or the like) may be received at the computing environment 100 along with the external code. The documentation may include comments or other information about the functions and other semantic entities within the external code. For example, "interface_fcn_1(int16u)" refers to a semantic entity of C++ code and is already included in a C/C++ library. However, the user can add information within a corresponding .arxml file to specify "rate: 0.1" for indicating the rate for executing that semantic entity. Alternatively, the user can add information within the .arxml file to specify that the argument type used by that semantic entity should be different. For example, the argument "int16u" may be understood in C to refer to an integer type; however, the user can specify "fixdt(1,16,3)" within the .arxml file to indicate that the argument "int16u" should be mapped to a fixed point type in the computing environment 100.

Such exemplary documentation processing may first include capturing source code comments that follow a pattern associated with documentation. For example, the comments may follow the rules for doxygen, javadoc, or another comment scheme used within an external code source environment. The source code comments may thus be identified as being associated with a particular semantic entity based on their locations within the source code and/or with reference to symbols nearby those comments within the external code files. In some cases, such as where it is difficult to determine that a source code comment is associated with a particular semantic entity based on the location of the comments within the external code or nearby symbols, a search may be performed for references to names of semantic entities within the comment itself.

Next, documentation associated with the external code or a source or development environment thereof may be augmented using the captured source code comments. In this way, the augmented documentation becomes usable for the computing environment 100. Augmenting the documentation may, for example, include one or more of changing names of the semantic entities when the name of the semantic entity used in the computing environment 100 differs from what is written in the source code comment, detecting other code examples based on tags or markdown usage indicating a possible example use of the semantic entity, and detecting code examples by applying a source language parser to the comment and finding fragments that may be parsed.

After the documentation is augmented, mappings for standard syntax of the source code comment may be identified to cause the use of the source code comment to be associated with the internal language syntax. In some cases, such as where it may be difficult to determine a precise mapping for the source code comment, the example in the source syntax may remain, but with an indication that the example is in the source language syntax. In such a case, a link to documentation may be created and used to guide the end user to mapping the source code comment into the computing environment 100. In some implementations, standard syntax for comments can include widely used industry standards such as "doxygen" or "javadoc style" comments. The doxygen documentation can also be found at http://doxygen.nl. In some implementations, documentation standards provide special tags or other ways to indicate or mark example code. When those indicators or markers are seen, the code in the example can be parsed as C or C++ code and the parsed constructs can be converted to code for computing environment 100 using a map between the syntax of identified language constructs from the source language into computing environment 100. For example, a "X→Y" construct might be turned into a "X.Y" construct. Another example of a mapping is from variable declarations that include a type to simply naming the variable. Thus, code of the form "<type><varname>=<expression>" are translated into "<varname>=<expression>." Another example is as follows:

auto X=new MyClass( );

double Y=X→getValue( );

which may be translated into:

X=MyClass( );

Y=X.getValue( );

For examples of indicators or markers, doxygen defines a tag "\example" that is used to specify a file path to a code file that contains an example. This example is inserted into documentation by the doxygen system. When finding this tag, the code file can be located and parsed as code in the source language and then translated into the language of computing environment 100 as described above.

In some implementations, a publisher of the documentation may be given permissions to edit the documentation after it is augmented. In some implementations, a machine learning approach (e.g., using deep learning algorithms) may be applied to enable the computing environment to learn from publisher edits, such as to automate the mapping of comments for use within the computing environment 100.

The following is an example using C++ syntax:

```
/** @brief Finds the positions of internal corners of the chessboard.
@param image Source chessboard view. It must be an 8-bit grayscale or color
image.
@param patternSize Number of inner corners per a chessboard row and column
( patternSize = cvSize(points_per_row,points_per_colum) = cvSize(columns,rows)
).
@param corners Output array of detected corners.
@param flags Various operation flags that can be zero or a combination of the
following values:
-    CALIB_CB_ADAPTIVE_THRESH Use adaptive thresholding to convert the
image to black and white, rather than a fixed threshold level (computed from
the average image brightness).
-    CALIB_CB_NORMALIZE_IMAGE Normalize the image gamma with equalize-
Hist
before applying fixed or adaptive thresholding.
-    CALIB_CB_FILTER_QUADS Use additional criteria (like contour area,
perimeter, square-like shape) to filter out false quads extracted at the
contour retrieval stage.
-    CALIB_CB_FAST_CHECK Run a fast check on the image that looks for
chessboard corners, and shortcut the call if none is found. This can
drastically speed up the call in the degenerate condition when no chessboard
is observed.
The function attempts to determine whether the input image is a view of the
chessboard pattern and locate the internal chessboard corners. The function
returns a non-zero value if all of the corners are found and they are placed
in a certain order (row by row, left to right in every row). Otherwise, if the
function fails to find all the corners or reorder them, it returns 0. For
example, a regular chessboard has 8 x 8 squares and 7 x 7 internal corners,
that is, points where the black squares touch each other. The detected
coordinates are approximate, and to determine their positions more accurately,
the function calls cornerSubPix. You also may use the function cornerSubPix
with different parameters if returned coordinates are not accurate enough.
Sample usage of detecting and drawing chessboard corners: :
@code
   Size patternsize(8,6); //interior number of corners
   Mat gray = ... .; //source image
   vector<Point2f> corners; //this will be filled by the detected corners
   //CALIB_CB_FAST_CHECK saves a lot of time on images
   //that do not contain any chessboard corners
   bool patternfound = findChessboardCorners(gray, patternsize, corners,
        CALIB_CB_ADAPTIVE_THRESH + CALIB_CB_NORMALIZE_IMAGE +
        CALIB_CB_FAST_CHECK);
   if(patternfound)
     cornerSubPix(gray, corners, Size(11, 11), Size(-1, -1),
        TermCriteria(CV_TERMCRIT_EPS + CV_TERMCRIT_ITER, 30, 0.1));
   drawChessboardCorners(img, patternsize, Mat(corners), patternfound);
@endcode
@note The function requires white space (like a square-thick border, the wider
the better) around the board to make the detection more robust in various
environments. Otherwise, if there is no border and the background is dark, the
outer black squares cannot be segmented properly and so the square grouping
```

-continued

```
and ordering algorithm fails.
*/
CV_EXPORTS_W bool findChessboardCorners( InputArray image, Size patternSize,
OutputArray corners, int flags = CALIB_CB_ADAPTIVE_THRESH +
CALIB_CB_NORMALIZE_IMAGE );
```

In MATLAB, the function may be renamed to "findCorners" using the definition file, e.g., using systems and methods described above.

clib.cvfun.findChessboardCorners Representation of C++ function findCorners. Finds the positions of internal corners of the chessboard.

The function attempts to determine whether the input image is a view of the chessboard pattern and locate the internal chessboard corners. The function returns a non-zero value if all of the corners are found and they are placed in a certain order (row by row, left to right in every row). Otherwise, if the function fails to find all the corners or reorder them, it returns 0. For example, a regular chessboard has 8×8 squares and 7×7 internal corners, that is, points where the black squares touch each other. The detected coordinates are approximate, and to determine their positions more accurately, the function calls cornerSubPix. You also may use the function cornerSubPix with different parameters if returned coordinates are not accurate enough.

The following example shows C++ code that can be converted or integrated to MATLAB code.

```
Sample usage of detecting and drawing chessboard corners: :
Size patternsize(8,6); //interior number of corners
Mat gray = ....; //source image
vector<Point2f> corners; //this will be filled by the detected corners
//CALIB_CB_FAST_CHECK saves a lot of time on images
//that do not contain any chessboard corners
bool patternfound = findChessboardCorners(gray, patternsize, corners,
    CALIB_CB_ADAPTIVE_THRESH + CALIB_CB_NORMALIZE_
    IMAGE + CALIB_CB_FAST_CHECK);
if(patternfound)
    cornerSubPix(gray, corners, Size(11, 11), Size(-1, -1),
    TermCriteria(CV_TERMCRIT_EPS + CV_TERMCRIT_ITER,
       30, 0.1));
drawChessboardCorners(img, patternsize, Mat(corners), patternfound);
inputs
    image     clib.cvfun.InputArray   Source chessboard view. It
                                      must be an 8-bit grayscale or color image.
    patternSize clib.cvfun.Size       Number of inner corners per a
                                      chessboard row and column.
                                      ( patternSize =
                                      cvSize(points_per_row,points_per_
                                      colum) = cvSize(columns,rows) ).
    corners   clib.cvfun.OutputArray  Output array of detected corners.
    flags     int32                   Various operation flags that can be zero
                                      or a combination of the following val-
ues:
                - CALIB_CB_ADAPTIVE_THRESH Use adaptive
                thresholding to convert the image to black
                and white, rather than a fixed threshold level
                (computed from the average image brightness).
                - CALIB_CB_NORMALIZE_IMAGE
                Normalize the image
                gamma with equalizeHist before applying fixed or
                adaptive thresholding.
                - CALIB_CB_FILTER_QUADS Use additional
                criteria (like contour area, perimeter,
                square-like shape) to filter out false quads
                extracted at the contour retrieval stage.
                - CALIB_CB_FAST_CHECK Run a fast check on
                the image that looks for chessboard corners,
                and shortcut the call if none is found. This can
                drastically speed up the call in the
                degenerate condition when no chessboard is observed.
```

6 Simulation Environment

Figure 24:
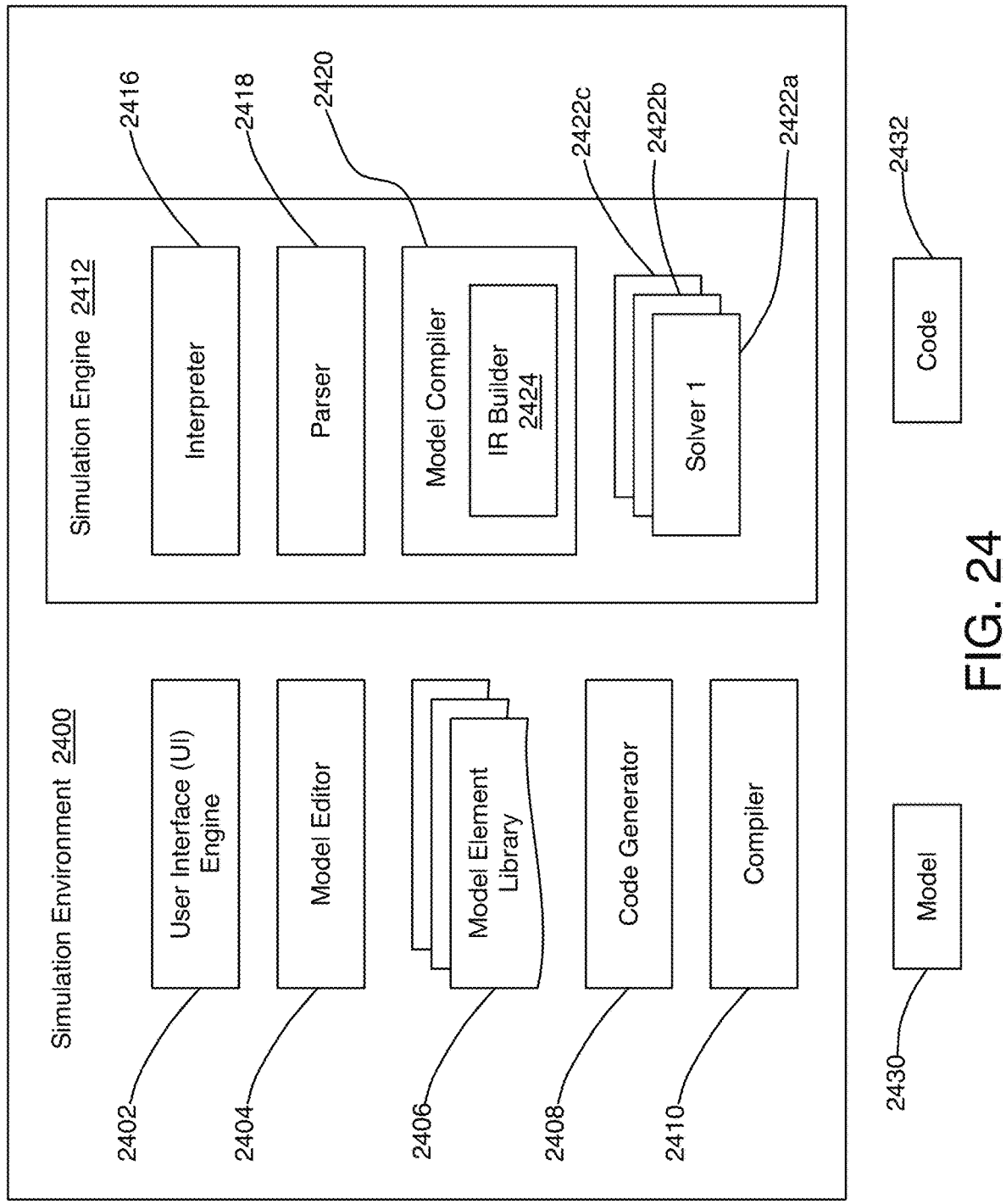
FIG. 24 is a schematic diagram of an example of a simulation environment in which the techniques described herein can be implemented.

FIG. 24 is a schematic diagram of an example of a simulation environment 2400 in which the techniques described herein can be implemented. The simulation environment 2400 may, for example, be the computing environment 100. The simulation environment 2400 may include a user interface engine 2402, a model editor 2404, one or more element libraries indicated at 2406, a code generator 2408, a compiler 2410, and a simulation engine 2412. Other implementations may include additional components, or may leave out some components, such as the code generator 2408 and/or the compiler 2410. The user interface engine 2402 may create and present one or more user interfaces, such as graphical user interfaces (GUIs) and/or command line interfaces (CLIs), on a display of a data processing device, such as a workstation, laptop, tablet, smartphone, etc. The GUIs and CLIs may provide a user interface to the simulation environment 2400, such as a model editing window. The model editor 2404 may perform selected operations on a model, such as open, create, edit, and save, in response to the user inputs or programmatically.

The simulation engine 2412 may include an interpreter 2416, a parser 2418, a model compiler 2420, and one or more solvers, such as solvers 2422a-c. The model compiler 2420 may include one or more Intermediate Representation (IR) builders, such as IR builder 2424. In some implementations, one or more IR builders may be included or associated with the solvers 2422. The simulation engine 2412 may execute, e.g., compile and run or interpret, computer-generated, executable models using one or more of the solvers 2422a-c. For example, the solvers 2422 may generate a set of equations for a model and may solve the set of equations. Another approach would be for the model compiler 2420 to create a data structure that represents, for example, model equations, and the solvers 2422 then use this data structure to generate solutions. For example, the solvers 2422 may generate a solution for an in-memory, intermediate representation (IR) of a model that represents a set of computational operations. The solvers 2422 may generate the solution for the IR using numerical techniques. Exemplary solvers include one or more fixed-step continuous time solvers, which may utilize numerical integration techniques, and one or more variable-step solvers, which may for example be based on the Runge-Kutta and Dormand-Prince pair. With a fixed-step solver, the step size remains constant throughout simulation of the model. With a variable-step solver, the step size can vary from step to step, for example to meet error tolerances. A non-exhaustive description of suitable solvers may be found in the Simulink User's Guide from The MathWorks, Inc. (March 2017 ed.). There may also be solvers to solve algebraic relations and solvers to find zero crossing locations of indicator functions. These solvers may have particular application in physics models.

The code generator 2408 may access a model, such as model 2430, and may generate code, such as code 2432, for the model 2430. In some implementations, the generated code may be source code, which may be compiled by the compiler 2410, and executed by one or more processors outside of the simulation environment 2400, or executable code, or other types of code. The generated code may thus be standalone code relative to the simulation environment 2400. Examples of generated code include Ada, Basic, C, C++, C #, CUDA, SystemC, Ada, FORTRAN, assembly code, and Hardware Description Language (HDL) code, such as VHDL, Verilog, or SystemC, among others, which may be used to synthesize a programmable logic device.

The compiler 2410 may prepare data structures and evaluate parameters, or parameter expressions, to create and/or initialize one or more data structures used in a compile stage. For each element, a method may force the element to evaluate all of its parameters. During the configuration and inferencing, for example by propagation, of element and port/signal characteristics, the compiled attributes (such as data dimensions, data types, complexity, sample modes, and sample time) of each element (and/or ports) may be setup on the basis of the corresponding behaviors and the attributes of elements (and/or ports) that are related to the given element, e.g., connected through lines that may be undirected relations or directed relations and shown as arrows. Attributes may also be setup based on the context of an element or a component in a model. For example, a subsystem, which may be a group of elements hierarchically represented as a single element, that has a given sample time may have this sample time be set based on the sample time of elements included in the subsystem (e.g., a unique sample time of all elements in the group or a base sample time such as the greatest common denominator of all sample times of the elements).

The attribute setup may be performed through a process during which element behaviors "ripple through" the model from one element to the next following signal or other connectivity, as well as through the hierarchical structure of the model, and may for example follow connectivity in a forward or backward manner. This process is referred to as "propagation." In the case of an element that has explicitly specified or characterized its element behaviors or the behaviors of its ports, propagation may help ensure that the attributes of the element are compatible with the attributes of the elements connected to it or contained by it. If not, an error may be issued. At least some elements may be implemented to be compatible with a wide range of attributes. Such elements may adapt their behavior in accordance with the attributes of the elements connected to them. The exact implementation of the element may be chosen on the basis of the model in which the element is located. Included within this step are other aspects such as validating that all rate-transitions (e.g., transitions of sample times that have different rates between two connected elements) yield deterministic results, and that the appropriate rate transition blocks are being used.

The compilation step also may determine element connectivity. For example, a model may include one or more virtual blocks that may play no semantic role in the execution of the model. In this step, the virtual blocks may be optimized away, e.g., removed, and the remaining non-virtual elements may be reconnected to each other appropriately. This compiled version of the model with actual element connections may be used from this point forward in the execution process.

Exemplary computing environments which may be the computing environment 100 described herein include the MATLAB® language/programming environment and the Simulink® model-based simulation and design environment. Alternatively, the computing environment 100 may refer to exemplary systems or tools used by such computing environments, which may be the Simscape™ physical modeling system, the SimEvent® discrete-event modeling tool, and the Stateflow® state chart modeling tool also from The MathWorks, Inc. Models created in the high-level computing environment may contain less implementation detail, and thus operate at a higher level than certain programming languages, such as the C, C++, C #, and SystemC programming languages.

A given model may simulate, for example, approximate the operation of, a system. Exemplary systems include physical systems, such as plants and controllers. A model may be executed in order to simulate the system being modeled, and the execution of a model may also be referred to as simulating the model. Models constructed within the simulation environment 2400 may include textual models, graphical models, such as block diagrams, state-based models, discrete-event models, physical or physics models, noncausal (or acausal) models (e.g., implicit equation based models), equation-based models, object-oriented models, and combinations thereof. A graphical model may include icons or blocks that represent computations, functions, or operations, and interconnecting lines or arrows among the blocks may represent data, signals, or relationships among those computations, functions, or operations. The icons or blocks, moreover, may be selected by the user from one or more of the libraries or palettes that contain icons or blocks for the blocks supported by the simulation environment 2400. A model editor GUI may include a Run button that may be selected by the user. The simulation environment 2400 may also be configured to receive a run command entered by the user, e.g., in the GUI or in a Command Line Interface (CLI). In response to the user selecting the Run button or entering the run command, the simulation engine 2412 may execute the model, and may present the results of the model's execution to a user. Exemplary graphical models include Simulink models, Simscape physical models, SimEvent models, Stateflow charts, LabVIEW block diagrams, MatrixX models, Scade models, Dymola models, VEE diagrams, and Rational Rhapsody models, among others. Other forms of a source program include Modelica models from the Modelica Association, Uniform Modeling Language (UML) models, and Systems Modeling Language (SysML) models, among others.

In some implementations, the simulation environment 2400 may implement a declarative language. A declarative language is a language that expresses the logic of a computation without describing its control flow. A declarative language may describe what a program must accomplish in terms of the problem domain, rather than describe how to accomplish it as a sequence of the programming language statements. In some cases, a declarative language may implement single assignment in which variables are assigned once and only once. Examples of support for declarative languages include the Simulink® model-based design environment, which is a time-based language, the Modelica modeling language, and the LabVIEW graphical programming system, Hardware Description Language (HDL), the Prolog language, and the Haskell language, among others. Behaviors of at least some of the elements and connection elements of a model may include computational implementations that are implicitly defined by a declarative language. The simulation environment 2400 may also support constraint modeling (or graphical constraint programming), for example, as supported by Simulink.

The simulation environment 2400 is intended for illustrative purposes and that the present disclosure may be used with other computing environments. For example, in some implementations, the code generator 2408 and/or the compiler 2410 may be separate from the simulation environment 2400.

One or more of the user interface engine 2402, the model editor 2404, the code generator 2408, the compiler 2410, and the simulation engine 2412 may be implemented through one or more software modules or libraries containing program instructions that perform the methods described herein. The software modules may be stored in a memory, such as a main memory, a persistent memory and/or a computer readable media, of a workstation, server, or other data processing machine or device, and executed by one or more processors. Other computer readable media may also be used to store and execute these program instructions, such as non-transitory computer readable media, including optical, magnetic, or magneto-optical media. In some implementations, one or more of the user interface engine 2402, the model editor 2404, the code generator 2408, the compiler 2410, and the simulation engine 2412 may comprise hardware registers and combinational logic configured and arranged to produce sequential logic circuits. In some implementations, various combinations of software and hardware, including firmware, may be utilized to implement the described methods.

Suitable code generators for use with the present disclosure include, but are not limited to, the Simulink Coder, the Embedded Coder, and the Simulink HDL Coder products from The MathWorks, Inc. of Natick, Mass., the TargetLink product from dSpace GmbH of Paderborn Germany, and QGen from Adacore. Suitable internal language compilers include the xPC Target™ tool from The MathWorks, Inc., and a C language compiler. However, other code generation systems and other compilers may be used.

Figure 25:
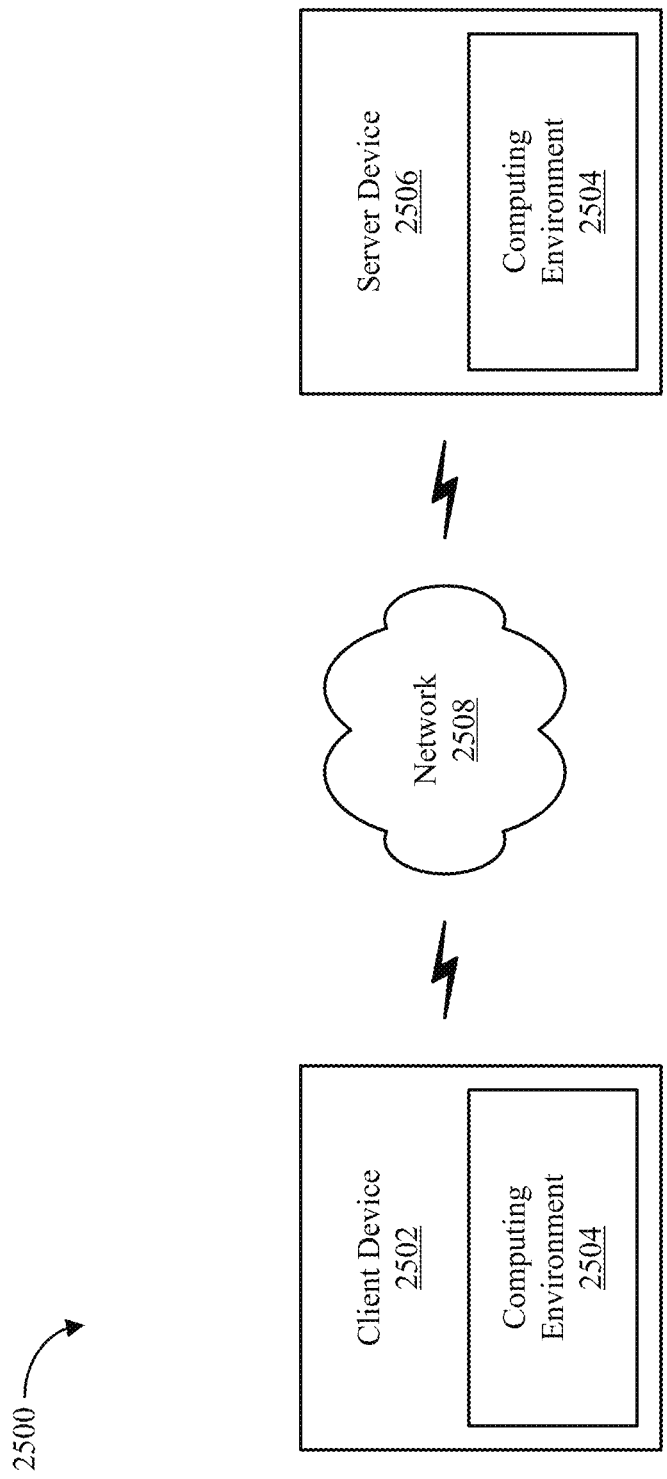
FIG. 25 is an illustration of an example environment in which an example computing environment described herein may be implemented.

FIG. 25 is an illustration of an example environment 2500 in which an example computing environment (e.g., the simulation environment 2400) described herein may be implemented. As shown in FIG. 25, the environment 2500 may include a client device 2502, which may include a computing environment 2504. Furthermore, the environment 2500 may include a server device 2506, which may include the computing environment 2504, and a network 2508. Devices of the environment 2500 may interconnect via wired connections, wireless connections, or a combination of wired and wireless connections.

The client device 2502 may include a device capable of receiving, generating, storing, processing, executing, and/or providing information, such as information associated with program code 102. For example, the client device 2502 may include a computing device, such as a desktop computer, a laptop computer, a tablet computer, a handheld computer, a server, a mobile phone (e.g., a smart phone, a radiotelephone, or the like), or a similar device. In some implementations, the client device 2502 may receive information from and/or provide information to the server device 2506.

The client device 2502 may host the computing environment 2504. Functions described herein as being performed by the computing environment 2504 may be performed by the client device 2502 and execution of the computing environment 2504 by the client device 2502. For example, the computing environment 2504 may be or include computing environment 100. The computing environment 2504 may provide mathematical functions and/or graphical tools (e.g., for creating plots, surfaces, images, volumetric representations, or the like). In some implementations, the computing environment 2504 may provide these functions and/or tools using toolboxes (e.g., toolboxes for signal processing, image processing, data plotting, parallel processing, or the like). In some implementations, the computing environment 2504 may provide these functions as block sets or in another way, such as via a library, a local or remote database (e.g., a database operating in a computing cloud), remote procedure calls (RPCs), an API, or the like.

The computing environment 2504 may include a modeling system that may be used in the creation of a functional model and that may enable generation of executable code based on the model. For example, the computing environment 2504 may include a graphical modeling tool or application that provides a user interface for a numerical computing environment. Additionally, or alternatively, the computing environment 2504 may include a graphical modeling tool and/or application that provides a user interface for modeling and simulating (e.g., by executing a model) a dynamic system (e.g., based on differential equations, difference equations, discrete events, discrete states, or the like). Execution of a model to simulate a system may also be referred to as simulating a model. The model may further include static relations (e.g., algebraic relations, stochastic relations, inequalities, or the like). In some implementations, the model may include different types, such as data flows, differential equations, difference equations, time-based block diagrams, state transition diagrams, entity flow diagrams, signal flow diagrams, discrete event systems, object diagrams, physical modeling diagrams, or the like.

The server device 2506 may include one or more devices capable of receiving, generating, storing, processing, and/or providing information, such as information associated with a model. For example, the server device 2506 may include a computing device, such as a server, a desktop computer, a laptop computer, a tablet computer, or a similar device. In some implementations, the server device 2506 may host the computing environment 2504. In some implementations, the client device 2502 may be used to access the computing environment 2504 running on one or more server devices 2506. For example, the multiple server devices 2506 may be used to execute code (e.g., serially or in parallel), and may provide respective results of executing the code to the client device 2502.

In some implementations, the client device 2502 and the server device 2506 may be owned by different entities. For example, an end user may own the client device 2502, and a third party may own the server device 2506. In some implementations, the server device 2506 may include a device operating in a cloud computing environment. In this way, front-end applications (e.g., a user interface) may be separated from back-end applications (e.g., code execution). Additionally, or alternatively, the server device 2506 may perform one, more, or all operations described elsewhere herein as being performed by the client device 2502.

The network 2508 may include one or more wired and/or wireless networks. For example, the network 2508 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 25 are provided as an example. In practice, there may be additional devices and/or networks, fewer devices and/or networks, different devices and/or networks, or differently arranged devices and/or networks than those shown in FIG. 25. Furthermore, two or more devices shown in FIG. 25 may be implemented within a single device, or a single device shown in FIG. 25 may be implemented as multiple, distributed devices. Additionally, or alternatively, a set of devices (e.g., one or more devices) of the environment 2500 may perform one or more functions described as being performed by another set of devices of the environment 2500.

Figure 26:
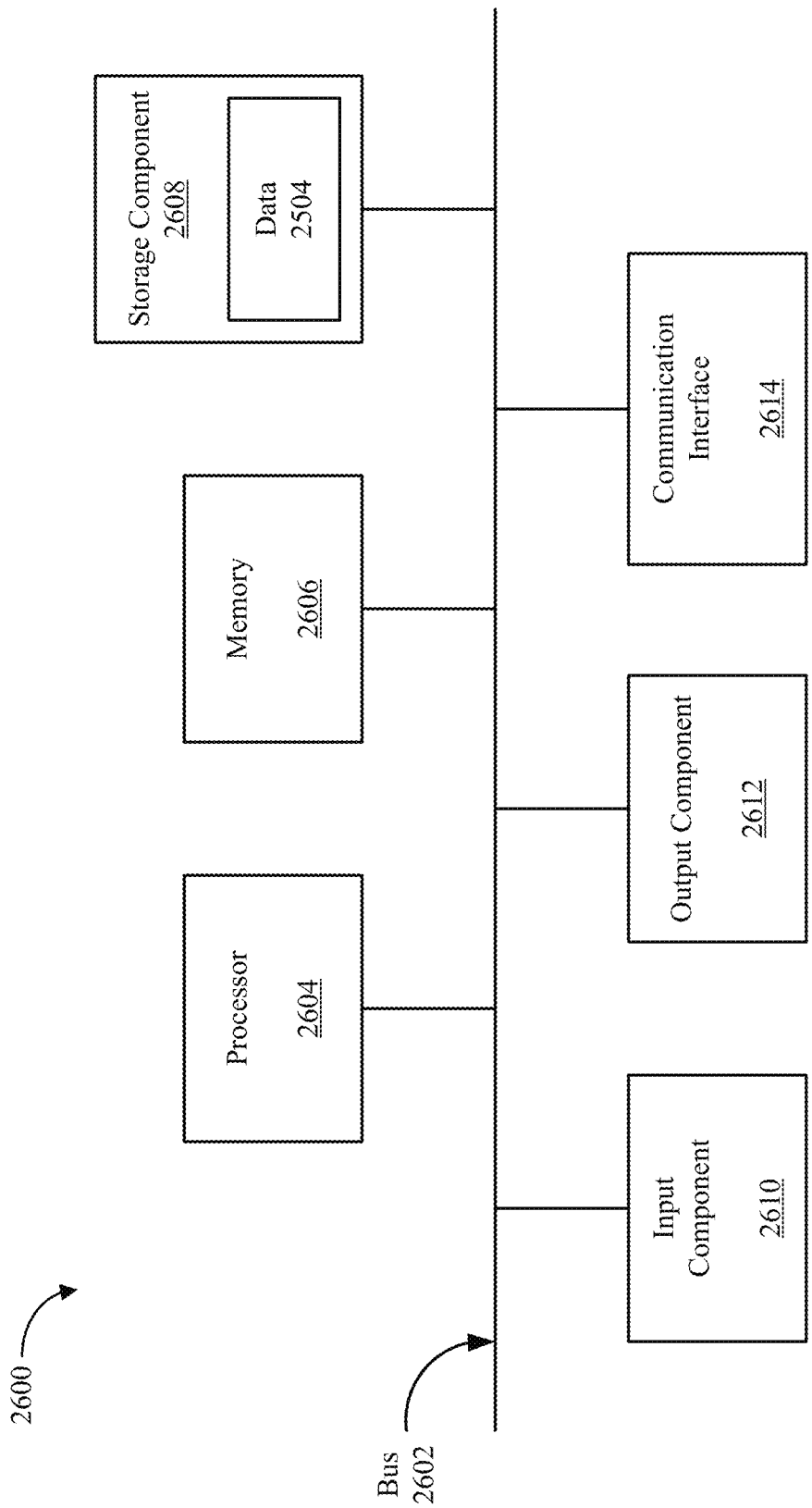
FIG. 26 is an illustration of examples of components of a device used by an example environment.

FIG. 26 is an illustration of examples of components of a device 2600 used by an example environment, for example, the example environment 2500. The device 2600 may correspond to the client device 2502 and/or the server device 2506. In some implementations, the client device 2502 and/or the server device 2506 may include one or more devices 2600 and/or one or more components of the device 2600. As shown in FIG. 4, the device 2600 may include a bus 2602, a processor 2604, a memory 2606, a storage component 2608, an input component 2610, an output component 2612, and a communication interface 2614. The bus 2602 may include a component that permits communication among the components of the device 2600.

The processor 2604 is implemented in hardware, firmware, or a combination of hardware and software. The processor 2604 may include a processor (e.g., a central processing unit (CPU), a graphics processing unit (GPU), an accelerated processing unit (APU), or the like), a microprocessor, and/or any processing component (e.g., a field-programmable gate array (FPGA), an application-specific integrated circuit (ASIC), or the like) that interprets and/or executes instructions, and/or that is designed to implement one or more computing tasks. In some implementations, the processor 2604 may include multiple processor cores for parallel computing.

The memory 2606 may include a random access memory (RAM), a read only memory (ROM), and/or another type of dynamic or static storage device (e.g., a flash memory, a magnetic memory, an optical memory, or the like) that stores information and/or instructions for use by the processor 2604.

The storage component 2608 may store information and/or software related to the operation and use of device 2600. For example, the storage component 2608 may include a hard disk (e.g., a magnetic disk, an optical disk, a magneto-optic disk, a solid state disk, or the like), a compact disc (CD), a digital versatile disc (DVD), a floppy disk, a cartridge, a magnetic tape, and/or another type of computer-readable medium, along with a corresponding drive. In some implementations, the storage component 2608 may store data used to implement a computing environment, such as the computing environment 2504.

The input component 2610 may include a component that permits the device 2600 to receive information, such as via user input (e.g., a touch screen display, a keyboard, a keypad, a mouse, a button, a switch, a microphone, or the like). Additionally, or alternatively, the input component 2610 may include a sensor for sensing information (e.g., a global positioning system (GPS) component, an accelerometer, a gyroscope, an actuator, or the like). The output component 2612 may include a component that provides output information from the device 2600 (e.g., a display, a speaker, one or more light-emitting diodes (LEDs), or the like).

The communication interface 2614 may include a transceiver-like component (e.g., a transceiver, a separate receiver and transmitter, or the like) that enables device 2600 to communicate with other devices, such as via a wired connection, a wireless connection, or a combination of wired and wireless connections. The communication interface 2614 may permit the device 2600 to receive information from another device and/or provide information to another device. For example, the communication interface 2614 may include an Ethernet interface, an optical interface, a coaxial interface, an infrared interface, a radio frequency (RF) interface, a universal serial bus (USB) interface, a Wi-Fi interface, a cellular network interface, or the like.

The device 2600 may perform one or more processes described herein. The device 2600 may perform these processes in response to the processor 2604 executing software instructions stored by a computer-readable medium, such as the memory 2606 and/or the storage component 2608. A computer-readable medium is defined herein as a non-transitory memory device. A memory device includes memory space within a single physical storage device or memory space spread across multiple physical storage devices.

Software instructions may be read into the memory 2606 and/or the storage component 2608 from another computer-readable medium or from another device via the communication interface 2614. When executed, software instructions stored in the memory 2606 and/or the storage component 2608 may cause the processor 2604 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 26 are provided as an example. In practice, the device 2600 may include additional components, fewer components, different components, or differently arranged components than those shown in FIG. 26. Additionally, or alternatively, a set of components (e.g., one or more components) of the device 2600 may perform one or more functions described as being performed by another set of components of the device 2600.

The headings above are intended to aid with readability of the application, and are not for use in construing aspects of, or determining the breath of, implementations of the invention described in the specification or claims. It is to be understood that the foregoing description is intended to illustrate and not to limit the scope of the invention, which is defined by the scope of the appended claims. Other implementations are within the scope of the following claims.

What is claimed is:

1. A computing system for processing external code that is not native to a computing environment, the computing system comprising:
a processing system, including at least one processor, configured to process the external code, the processing including:
parsing the external code to identify a first semantic entity,
mapping the first semantic entity to a second semantic entity associated with the computing environment, the first semantic entity comprising a first set of one or more specified attributes and the second semantic entity comprising a second set of one or more attributes that are capable of being specified, determining that at least a first attribute of the second set of one or more attributes does not have a corresponding specified attribute within the first set of one or more specified attributes, wherein the first attribute of the second set of one or more attributes comprises: a fixed point datatype, a sample rate, a unit, an input or output scope, a complexity, an attribute indicating pass-by-reference or pass-by-value, an attribute indicating read-before-write or write-before-read, an attribute indicating a mutable or immutable property, an attribute indicating a side-effect-full or side-effect-free nature of a function, array or matrix dimensions, a thread-safety property, or an exception throwing behavior, determining available information for specifying the first attribute of the second set of one or more attributes, providing the available information to a user interface system for providing to a user for selection or specifying the first attribute of the second set of one or more attributes, and storing the second semantic entity in association with the first attribute of the second set of one or more attributes specified based on the user selection or specifying.

2. The computing system of claim 1, wherein the processing further comprises: generating a user interface element for the second semantic entity; and storing the user interface element in a library of the computing environment, or using the user interface element in program code developed in the computing environment.

3. The computing system of claim 2, wherein the user interface element comprises a graphical element in a graphical programming canvas environment, or a textual symbol callable from the computing environment.

4. The computing system of claim 1, wherein the processing further comprises debugging the first entity using the second semantic entity in the computing environment.

5. The computing system of claim 1, wherein the processing further comprises generating code for the first entity using the second semantic entity.

6. The computing system of claim 1, wherein the processing further comprises performing cross-domain optimization across the first and second semantic entities, and the cross-domain optimization comprises: inlining, data copy minimization, retargetable code generation, static analysis, property proving, modified condition/decision coverage (MC/DC), decision coverage, test vector generation, report generation, requirements linking, certification checking, continuous integration (CI) tool support, or identification or merging of differences.

7. The computing system of claim 1, wherein the second semantic entity comprises: a named function associated with at least one input parameter or output parameter, a named variable associated with storage of a corresponding type, a named semantic category associated with a class or service, a keyword associated with a type of a variable or parameter or associated with functionality for a semantic entity, a rate, a constant, a reference, a type, a structure, a state, or a service port.

8. The computing system of claim 1, wherein the first semantic entity comprises: an entity in a language comprising C, C++, C #, CUDA, SystemC, Java, FORTRAN, Python, Visual Studio, HDL, VHDL, or Verilog; or an entity in a platform comprising OpenCV, AWS SDK for C++, OpenDDS, ZeroMQ, Qt, Halide, TensorFlow C++ API, Pytorch C++ API, Caffe, Clmg, Libtiff, Crypto++, Tesseract, FreeImagePlus, LibXL, Tonic, or Botan, OpenCV, OpenDDS, or Tensorflow.

9. The computing system of claim 1, wherein the processing further comprises integrating documentation associated with the first semantic entity into documentation associated with the second semantic entity.

10. A method for processing external code that is not native to a computing environment, the method comprising:
    parsing the external code to identify a first semantic entity,
    mapping the first semantic entity to a second semantic entity associated with the computing environment, the first semantic entity comprising a first set of one or more specified attributes and the second semantic entity comprising a second set of one or more attributes that are capable of being specified,
    determining that at least a first attribute of the second set of one or more attributes does not have a corresponding specified attribute within the first set of one or more specified attributes, wherein the first attribute of the second set of one or more attributes comprises: a fixed point datatype, a sample rate, a unit, an input or output scope, a complexity, an attribute indicating pass-by-reference or pass-by-value, an attribute indicating read-before-write or write-before-read, an attribute indicating a mutable or immutable property, an attribute indicating a side-effect-full or side-effect-free nature of a function, array or matrix dimensions, a thread-safety property, or an exception throwing behavior,
    determining available information for specifying the first attribute of the second set of one or more attributes,
    providing the available information to a user interface system for providing to a user for selection or specifying the first attribute of the second set of one or more attributes, and
    storing the second semantic entity in association with the first attribute of the second set of one or more attributes specified based on the user selection or specifying.

11. The method of claim 10, further comprising: generating a user interface element for the second semantic entity, and storing the user interface element in a library of the computing environment, or using the user interface element in program code developed in the computing environment.

12. The method of claim 11, wherein the user interface element comprises a graphical element in a graphical programming canvas environment, or a textual symbol callable from the computing environment.

13. One or more non-transitory computer-readable media, having stored thereon instructions for processing external code that is not native to a computing environment, where the instructions, when executed by a computing system, cause a computing system to perform operations comprising:
    parsing the external code to identify a first semantic entity,
    mapping the first semantic entity to a second semantic entity associated with the computing environment, the first semantic entity comprising a first set of one or more specified attributes and the second semantic entity comprising a second set of one or more attributes that are capable of being specified,
    determining that at least a first attribute of the second set of one or more attributes does not have a corresponding specified attribute within the first set of one or more specified attributes, wherein the first attribute of the second set of one or more attributes comprises: a fixed point datatype, a sample rate, a unit, an input or output scope, a complexity, an attribute indicating pass-by-reference or pass-by-value, an attribute indicating read-before-write or write-before-read, an attribute indicating a mutable or immutable property, an attribute indicating a side-effect-full or side-effect-free nature of a function, array or matrix dimensions, a thread-safety property, or an exception throwing behavior, determining available information for specifying the first attribute of the second set of one or more attributes, providing the available information to a user interface system for providing to a user for selection or specifying the first attribute of the second set of one or more attributes, and storing the second semantic entity in association with the first attribute of the second set of one or more attributes specified based on the user selection or specifying.

14. The one or more non-transitory computer-readable media of claim 13, wherein the operations further comprise: generating a user interface element for the second semantic entity; and storing the user interface element in a library of the computing environment, or using the user interface element in program code developed in the computing environment.

15. The one or more non-transitory computer-readable media of claim 14, wherein the user interface element comprises a graphical element in a graphical programming canvas environment, or a textual symbol callable from the computing environment.

16. A method comprising:
generating second code for first code that includes third code that is native to a computing environment and fourth code that is external to the computing environment, the fourth code being integrated and represented by fifth code native in the computing environment, and the generating comprising:
identifying a semantic entity of the fifth code,
mapping the semantic entity of the fifth code to a semantic entity of the fourth code based on a mapping from the semantic entity of the fourth code to the semantic entity of the fifth code, the mapping comprising determining that a corresponding attribute of at least one attribute of the semantic entity of the fifth code does not exist or is to be underspecified in the semantic entity of the fourth code, wherein the at least one attribute of the of the semantic entity of the fifth code comprises: a fixed point datatype, a sample rate, a unit, an input or output scope, a complexity, an attribute indicating pass-by-reference or pass-by-value, an attribute indicating read-before-write or write-before-read, an attribute indicating a mutable or immutable property, an attribute indicating a side-effect-full or side-effect-free nature of a function, array or matrix dimensions, a thread-safety property, or an exception throwing behavior, and
generating the second code based on the mapping the semantic entities of the fifth code and the fourth code.

17. The method of claim 16, wherein generating the second code comprises generating a function call to the fourth code.

18. The method of claim 17, wherein generating the second code comprises generating code for the third code and including the function call with the code generated for the third code.

19. The method of claim 16, wherein generating the second code comprises in-lining the fourth code in the generated second code.

20. The method of claim 16, wherein the fourth code comprises: code in a language comprising C, C++, C #, CUDA, SystemC, Java, FORTRAN, Python, Visual Studio, HDL, VHDL, or Verilog; or code in a platform comprising OpenCV, AWS SDK for C++, OpenDDS, ZeroMQ, Qt, Halide, TensorFlow C++ API, Pytorch C++ API, Caffe, Clmg, Libtiff, Crypto++, Tesseract, FreeImagePlus, LibXL, Tonic, or Botan, OpenCV, OpenDDS, or Tensorflow.

21. A computing system comprising:
a processing system, including at least one processor, configured to process the external code, the processing including:
generating second code for first code that includes third code that is native to a computing environment and fourth code that is external to the computing environment, the fourth code being integrated and represented by fifth code native in the computing environment, and the generating comprising:
identifying a semantic entity of the fifth code,
mapping the semantic entity of the fifth code to a semantic entity of the fourth code based on a mapping from the semantic entity of the fourth code to the semantic entity of the fifth code, the mapping comprising determining that a corresponding attribute of at least one attribute of the semantic entity of the fifth code does not exist or is to be underspecified in the semantic entity of the fourth code, wherein the at least one attribute of the of the semantic entity of the fifth code comprises: a fixed point datatype, a sample rate, a unit, an input or output scope, a complexity, an attribute indicating pass-by-reference or pass-by-value, an attribute indicating read-before-write or write-before-read, an attribute indicating a mutable or immutable property, an attribute indicating a side-effect-full or side-effect-free nature of a function, array or matrix dimensions, a thread-safety property, or an exception throwing behavior, and
generating the second code based on the mapping the semantic entities of the fifth code and the fourth code.

22. One or more non-transitory computer-readable media, having stored thereon instructions that, when executed by a computing system, cause a computing system to perform operations comprising:
generating second code for first code that includes third code that is native to a computing environment and fourth code that is external to the computing environment, the fourth code being integrated and represented by fifth code native in the computing environment, and the generating comprising:
identifying a semantic entity of the fifth code,
mapping the semantic entity of the fifth code to a semantic entity of the fourth code based on a mapping from the semantic entity of the fourth code to the semantic entity of the fifth code, the mapping comprising determining that a corresponding attribute of at least one attribute of the semantic entity of the fifth code does not exist or is to be underspecified in the semantic entity of the fourth code, wherein the at least one attribute of the of the semantic entity of the fifth code comprises: a fixed point datatype, a sample rate, a unit, an input or output scope, a complexity, an attribute indicating pass-by-reference or pass-by-value, an attribute indicating read-before-write or write-before-read, an attribute indicating a mutable or immutable property, an attribute indicating a side-effect-full or side-effect-free nature of a function, array or matrix dimensions, a thread-safety property, or an exception throwing behavior, and generating the second code based on the mapping the semantic entities of the fifth code and the fourth code.

23. A computing system for processing external code that is not native to a computing environment, the computing system comprising:

a processing system, including at least one processor, configured to process the external code, the processing including:

parsing the external code to identify a first semantic entity, mapping the first semantic entity to a second semantic entity associated with the computing environment, the first semantic entity comprising a first set of one or more specified attributes and the second semantic entity comprising a second set of one or more attributes that are capable of being specified, determining that at least a first attribute of the second set of one or more attributes does not have a corresponding specified attribute within the first set of one or more specified attributes, determining available information for specifying the first attribute of the second set of one or more attributes, providing the available information to a user interface system for providing to a user for selection or specifying the first attribute of the second set of one or more attributes, storing the second semantic entity in association with the first attribute of the second set of one or more attributes specified based on the user selection or specifying, and performing an operation associated with the first and second semantic entities, wherein the operation comprises: inlining, data copy minimization, retargetable code generation, static analysis, property proving, modified condition/decision coverage (MC/DC), decision coverage, test vector generation, report generation, requirements linking, certification checking, continuous integration (CI) tool support, or identification or merging of differences.

24. A method for processing external code that is not native to a computing environment, the method comprising:

parsing the external code to identify a first semantic entity, mapping the first semantic entity to a second semantic entity associated with the computing environment, the first semantic entity comprising a first set of one or more specified attributes and the second semantic entity comprising a second set of one or more attributes that are capable of being specified, determining that at least a first attribute of the second set of one or more attributes does not have a corresponding specified attribute within the first set of one or more specified attributes, determining available information for specifying the first attribute of the second set of one or more attributes, providing the available information to a user interface system for providing to a user for selection or specifying the first attribute of the second set of one or more attributes, storing the second semantic entity in association with the first attribute of the second set of one or more attributes specified based on the user selection or specifying, and performing an operation associated with the first and second semantic entities, wherein the operation comprises: inlining, data copy minimization, retargetable code generation, static analysis, property proving, modified condition/decision coverage (MC/DC), decision coverage, test vector generation, report generation, requirements linking, certification checking, continuous integration (CI) tool support, or identification or merging of differences.

25. One or more non-transitory computer-readable media, having stored thereon instructions for processing external code that is not native to a computing environment, where the instructions, when executed by a computing system, cause a computing system to perform operations comprising:

parsing the external code to identify a first semantic entity, mapping the first semantic entity to a second semantic entity associated with the computing environment, the first semantic entity comprising a first set of one or more specified attributes and the second semantic entity comprising a second set of one or more attributes that are capable of being specified, determining that at least a first attribute of the second set of one or more attributes does not have a corresponding specified attribute within the first set of one or more specified attributes, determining available information for specifying the first attribute of the second set of one or more attributes, providing the available information to a user interface system for providing to a user for selection or specifying the first attribute of the second set of one or more attributes, and storing the second semantic entity in association with the first attribute of the second set of one or more attributes specified based on the user selection or specifying, and performing an operation associated with the first and second semantic entities, wherein the operation comprises: inlining, data copy minimization, retargetable code generation, static analysis, property proving, modified condition/decision coverage (MC/DC), decision coverage, test vector generation, report generation, requirements linking, certification checking, continuous integration (CI) tool support, or identification or merging of differences.

26. A method comprising:

generating second code for first code that includes third code that is native to a computing environment and fourth code that is external to the computing environment, the fourth code being integrated and represented by fifth code native in the computing environment, and the generating comprising:

identifying a semantic entity of the fifth code, mapping the semantic entity of the fifth code to a semantic entity of the fourth code based on a mapping from the semantic entity of the fourth code to the semantic entity of the fifth code, the mapping comprising determining that a corresponding attribute of at least one attribute of the semantic entity of the fifth code does not exist or is to be underspecified in the semantic entity of the fourth code, generating the second code based on the mapping the semantic entities of the fifth code and the fourth code, and generating code to perform an operation associated with the semantic entities of the fifth code and the fourth code, wherein the operation comprises: inlining, data copy minimization, retargetable code generation, static analysis, property proving, modified condition/decision coverage (MC/DC), decision coverage, test vector generation, report generation, requirements linking, certification checking, continuous integration (CI) tool support, or identification or merging of differences.

27. A computing system comprising:
a processing system, including at least one processor, configured to process the external code, the processing including:
generating second code for first code that includes third code that is native to a computing environment and fourth code that is external to the computing environment, the fourth code being integrated and represented by fifth code native in the computing environment, and the generating comprising:
identifying a semantic entity of the fifth code,
mapping the semantic entity of the fifth code to a semantic entity of the fourth code based on a mapping from the semantic entity of the fourth code to the semantic entity of the fifth code, the mapping comprising determining that a corresponding attribute of at least one attribute of the semantic entity of the fifth code does not exist or is to be underspecified in the semantic entity of the fourth code,
generating the second code based on the mapping the semantic entities of the fifth code and the fourth code, and
generating code to perform an operation associated with the semantic entities of the fifth code and the fourth code, wherein the operation comprises: inlining, data copy minimization, retargetable code generation, static analysis, property proving, modified condition/decision coverage (MC/DC), decision coverage, test vector generation, report generation, requirements linking, certification checking, continuous integration (CI) tool support, or identification or merging of differences.

28. One or more non-transitory computer-readable media, having stored thereon instructions for processing external code that is not native to a computing environment, where the instructions, when executed by a computing system, cause a computing system to perform operations comprising:
generating second code for first code that includes third code that is native to a computing environment and fourth code that is external to the computing environment, the fourth code being integrated and represented by fifth code native in the computing environment, and the generating comprising:
identifying a semantic entity of the fifth code,
mapping the semantic entity of the fifth code to a semantic entity of the fourth code based on a mapping from the semantic entity of the fourth code to the semantic entity of the fifth code, the mapping comprising determining that a corresponding attribute of at least one attribute of the semantic entity of the fifth code does not exist or is to be underspecified in the semantic entity of the fourth code,
generating the second code based on the mapping the semantic entities of the fifth code and the fourth code, and
generating code to perform an operation associated with the semantic entities of the fifth code and the fourth code, wherein the operation comprises: inlining, data copy minimization, retargetable code generation, static analysis, property proving, modified condition/decision coverage (MC/DC), decision coverage, test vector generation, report generation, requirements linking, certification checking, continuous integration (CI) tool support, or identification or merging of differences.

* * * * *